(12) United States Patent
Hofmann et al.

(10) Patent No.: US 7,300,109 B2
(45) Date of Patent: Nov. 27, 2007

(54) SEAT ASSEMBLY FOR A MOTOR VEHICLE SEAT

(75) Inventors: Jochen Hofmann, Marktgraitz (DE); Jürgen Angermüller, Mitwitz (DE); Thomas Haagen, Obersiemau (DE); Matthias Fischer, Kronach (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 134 days.

(21) Appl. No.: 10/527,348

(22) PCT Filed: Sep. 16, 2003

(86) PCT No.: PCT/DE03/03143

§ 371 (c)(1), (2), (4) Date: Mar. 9, 2005

(87) PCT Pub. No.: WO2004/030979

PCT Pub. Date: Apr. 15, 2004

(65) Prior Publication Data

US 2005/0248197 A1 Nov. 10, 2005

(30) Foreign Application Priority Data

Sep. 27, 2002 (DE) .............................. 102 46 473
Sep. 27, 2002 (DE) ........................... 202 15 321 U
Aug. 11, 2003 (DE) .............................. 103 37 682

(51) Int. Cl.
*B60N 2/02* (2006.01)

(52) U.S. Cl. .................... 297/362; 297/353; 297/378.1; 297/378.14

(58) Field of Classification Search ................ 297/367, 297/378.1, 378.12, 378.13, 362; 16/353, 16/324, 325, 326
See application file for complete search history.

(56) References Cited

U.S. PATENT DOCUMENTS

| 2,042,886 | A | * | 6/1936 | Ferguson | ...................... 16/361 |
| 4,726,622 | A | * | 2/1988 | Palvolgyi | ............... 297/378.12 |
| 4,969,682 | A | * | 11/1990 | Gray | ........................ 297/378.1 |
| 5,015,026 | A | * | 5/1991 | Mouri | ...................... 296/65.17 |

(Continued)

FOREIGN PATENT DOCUMENTS

DE 32 19 311 C2 12/1982

(Continued)

OTHER PUBLICATIONS

English translation of International Preliminary Examination Report dated Sep. 1, 2004 for PCT/DE2003/003143.

(Continued)

*Primary Examiner*—David Dunn
*Assistant Examiner*—Erika Garrett
(74) *Attorney, Agent, or Firm*—Christie, Parker & Hale, LLP

(57) ABSTRACT

The invention relates to a seat assembly for a motor vehicle seat, comprising a seat frame, which defines a seating surface for a motor vehicle occupant and pivotally mounted backrest, which can be folded onto the seating surface about a pivoting axis. According to the invention, the pivoting axis is displaced along a predetermined path, when the backrest is folded forwards onto the seating surface.

12 Claims, 15 Drawing Sheets

U.S. PATENT DOCUMENTS

| | | | | |
|---|---|---|---|---|
| 5,383,710 | A * | 1/1995 | Premji | 297/378.12 |
| 5,518,296 | A * | 5/1996 | Compardo | 297/378.1 |
| 5,520,440 | A * | 5/1996 | Lee | 297/378.12 |
| 5,544,939 | A * | 8/1996 | Baret et al. | 297/378.12 |
| 5,918,940 | A * | 7/1999 | Wakamatsu et al. | 297/410 |
| 5,927,809 | A * | 7/1999 | Tame | 297/341 |
| 5,979,985 | A | 11/1999 | Bauer et al. | |
| 5,997,090 | A | 12/1999 | Baloche et al. | |
| 6,186,595 | B1 * | 2/2001 | Ward et al. | 297/378.1 |
| 6,513,875 | B1 * | 2/2003 | Gray et al. | 297/378.14 |
| 6,588,846 | B2 * | 7/2003 | Arrenberg et al. | 297/378.12 |
| 6,752,461 | B2 * | 6/2004 | Hamelin | 297/378.12 |
| 2001/0030456 | A1 | 10/2001 | Biletskiy | |
| 2004/0051361 | A1 | 3/2004 | Rausch et al. | |

FOREIGN PATENT DOCUMENTS

| | | |
|---|---|---|
| DE | 196 46 470 A1 | 5/1998 |
| DE | 101 09 822 A1 | 9/2001 |
| DE | 100 47 743 A1 | 4/2002 |
| DE | 100 57 724 A1 | 5/2002 |
| EP | 0 404 628 A1 | 12/1990 |
| FR | 2 781 435 A1 | 1/2000 |
| GB | 2 099 691 A | 12/1982 |
| GB | 2 374 001 A | 10/2002 |

OTHER PUBLICATIONS

International Search Report of PCT/DE2003/003143, dated Mar. 11, 2004.

International Preliminary Examination Report of PCT/DE2003/003143, dated Sep. 1, 2004.

* cited by examiner

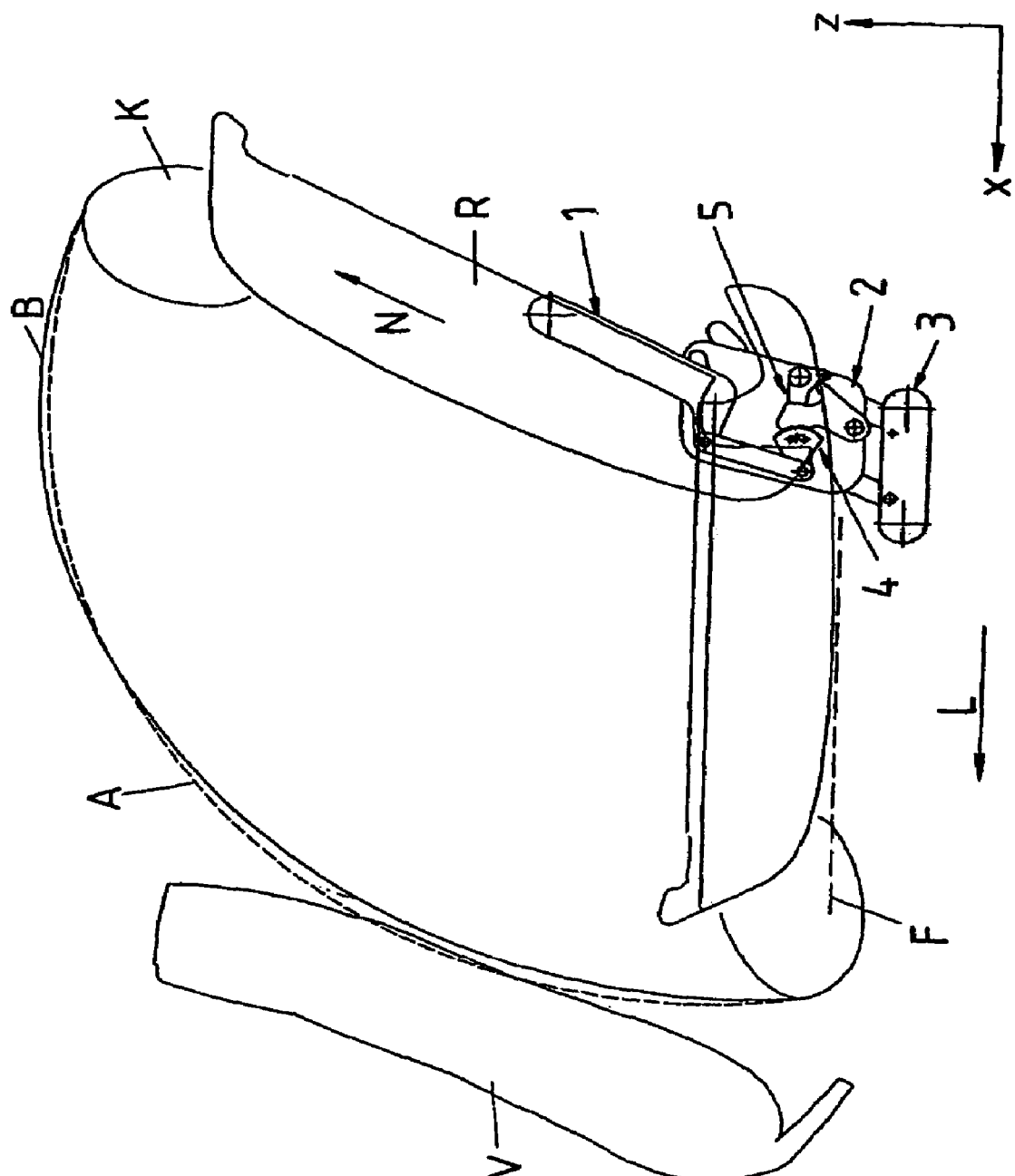

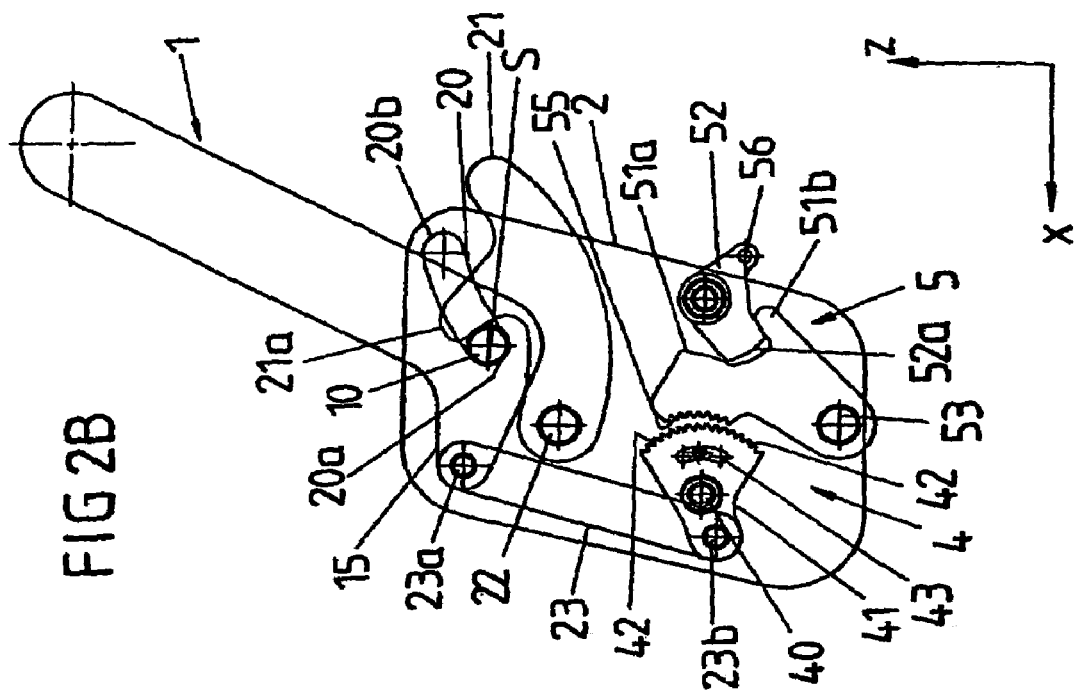
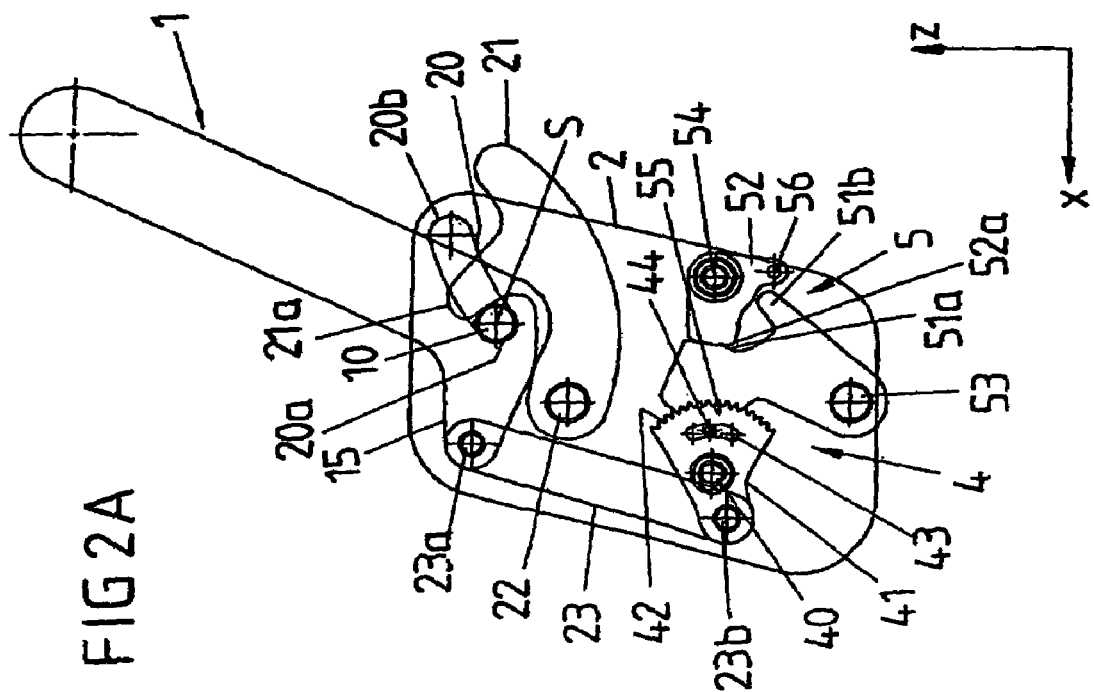

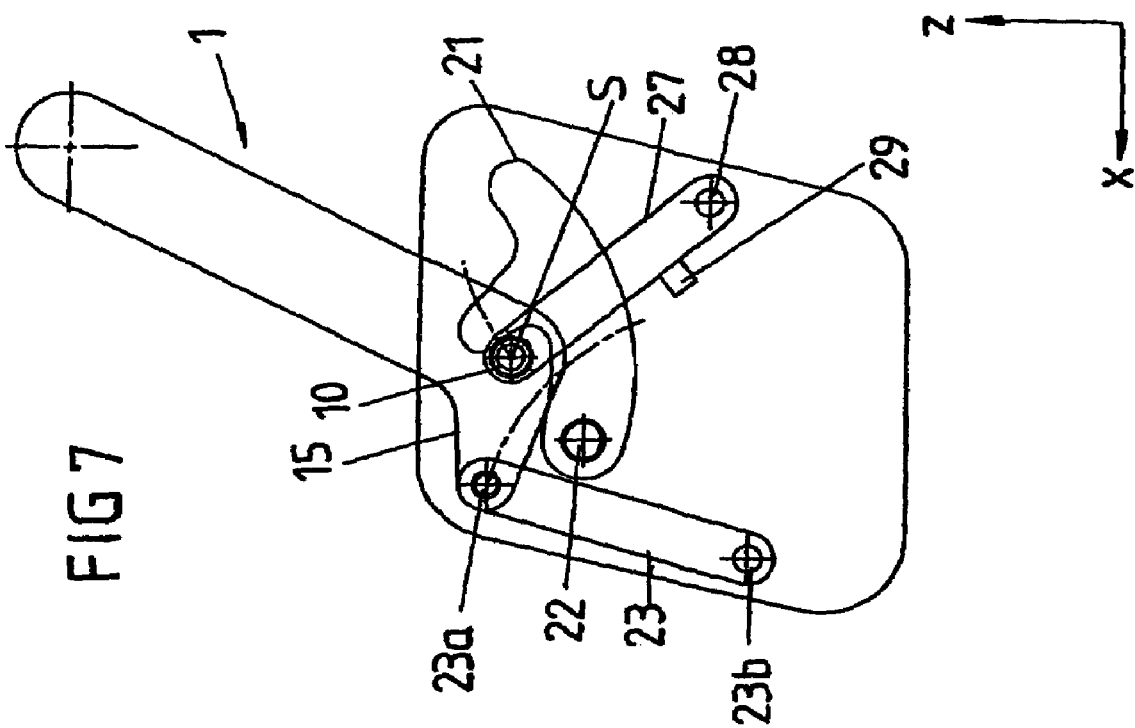
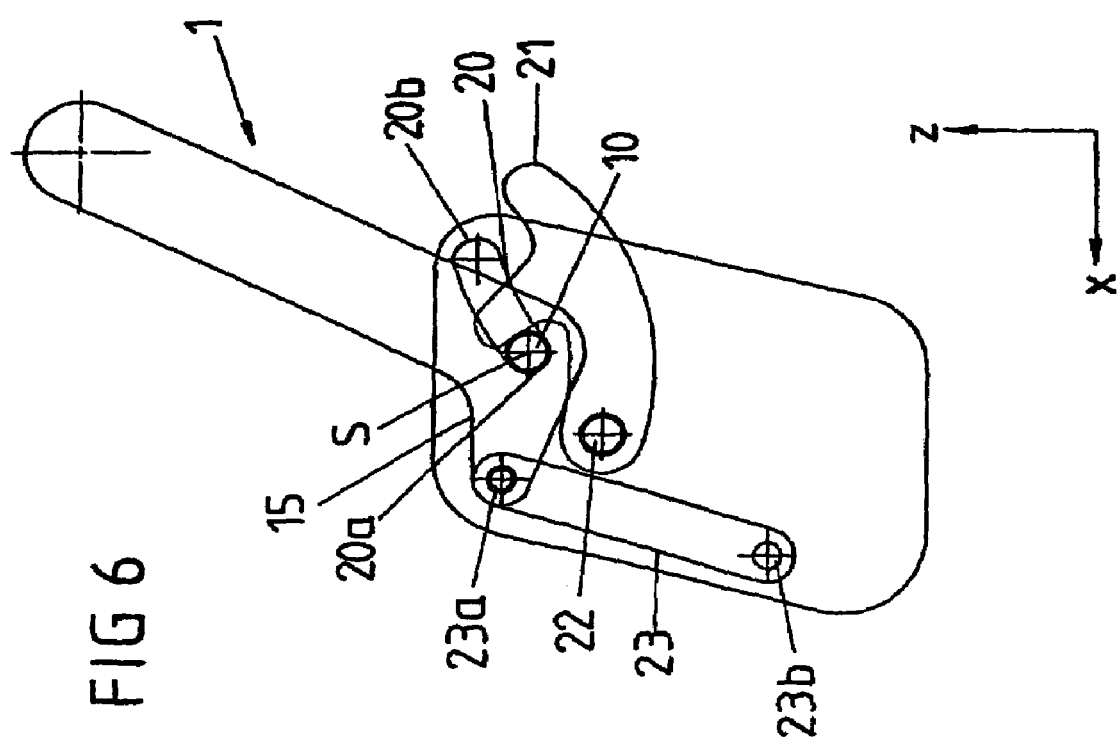

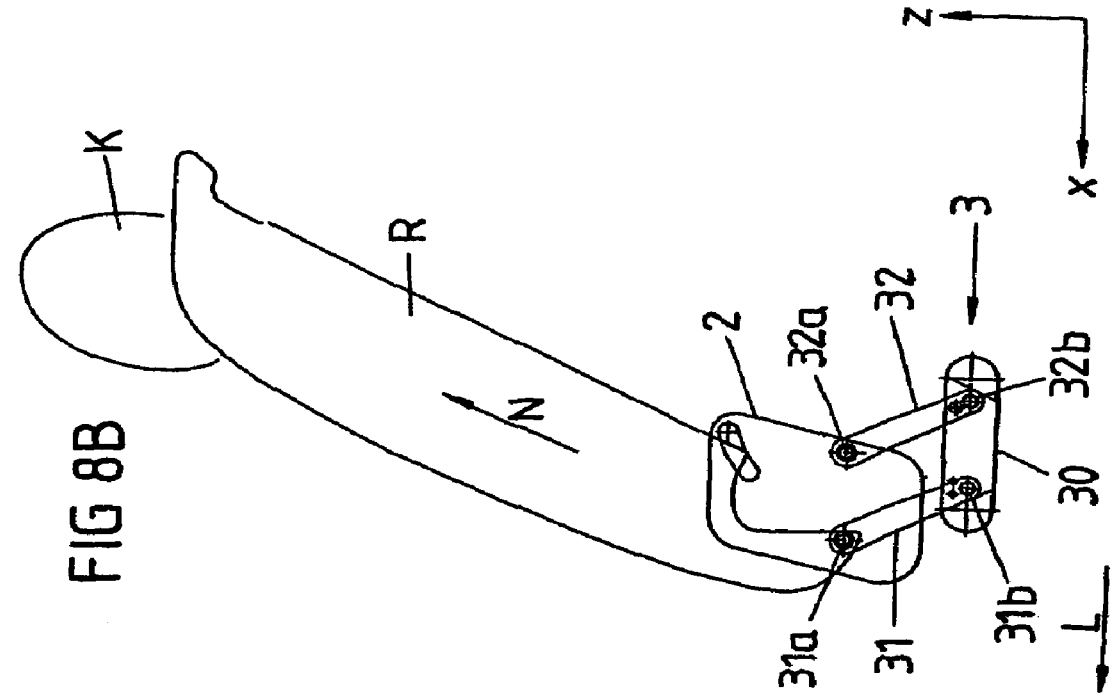
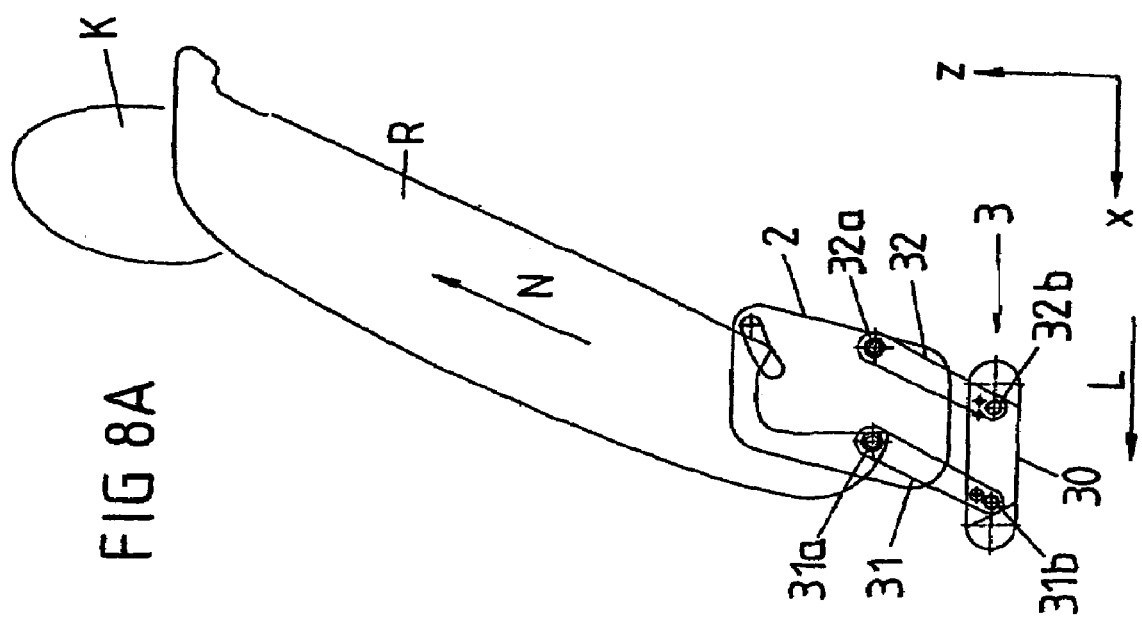

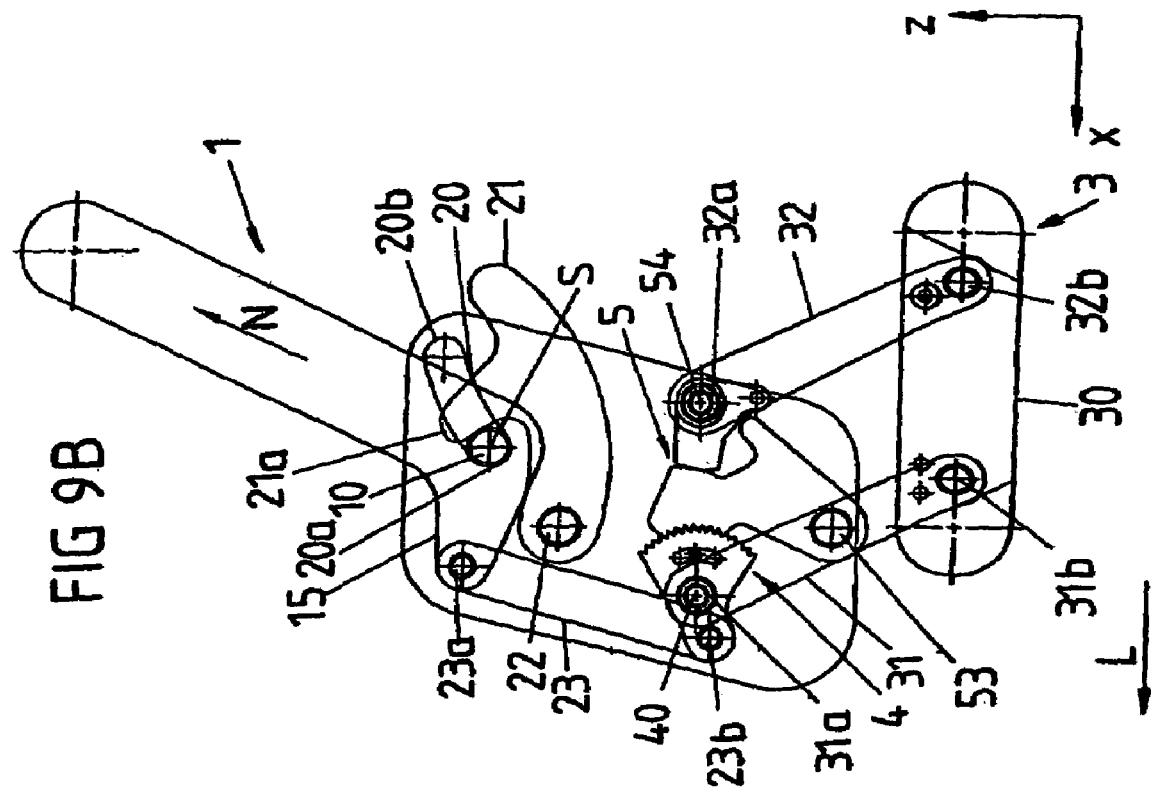
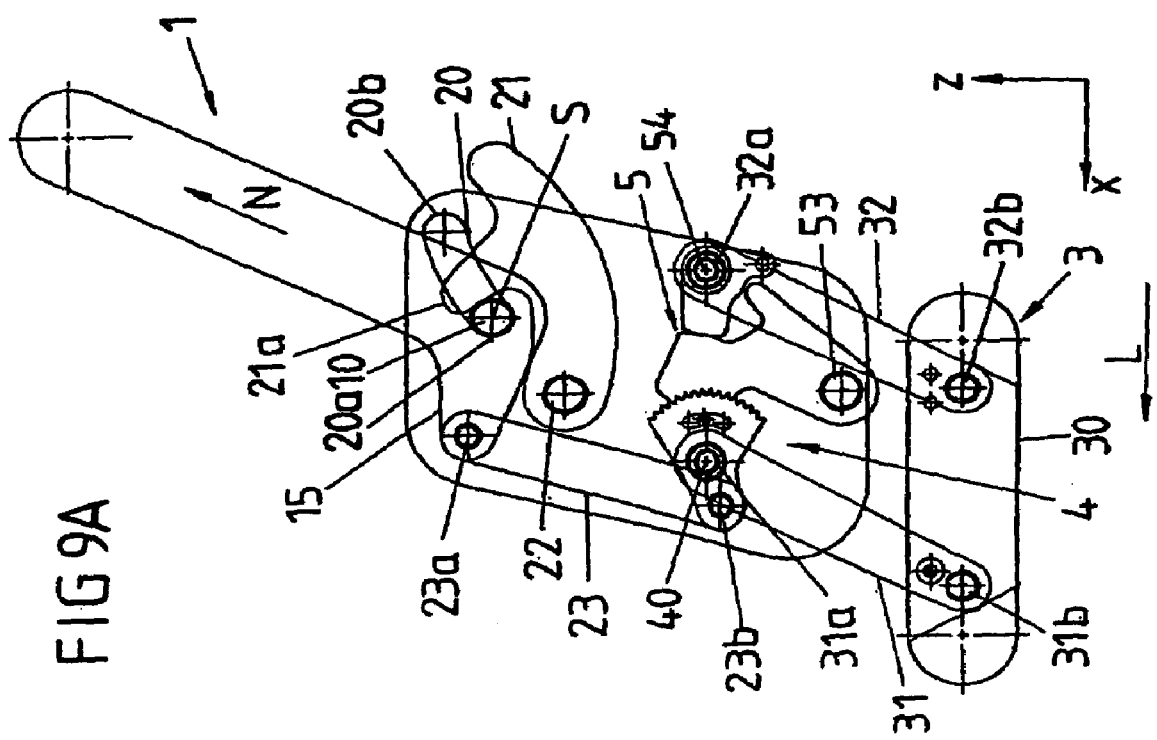

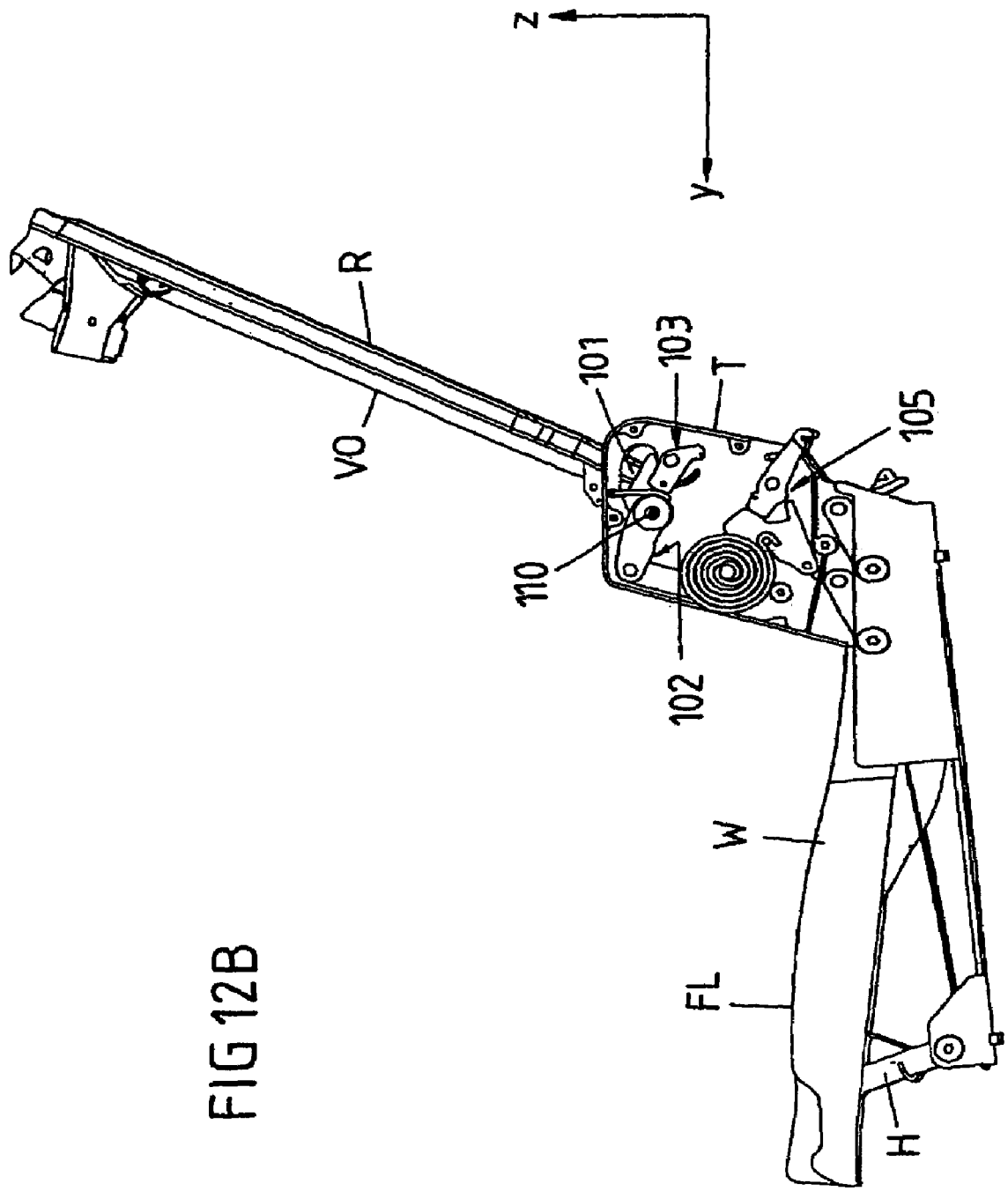

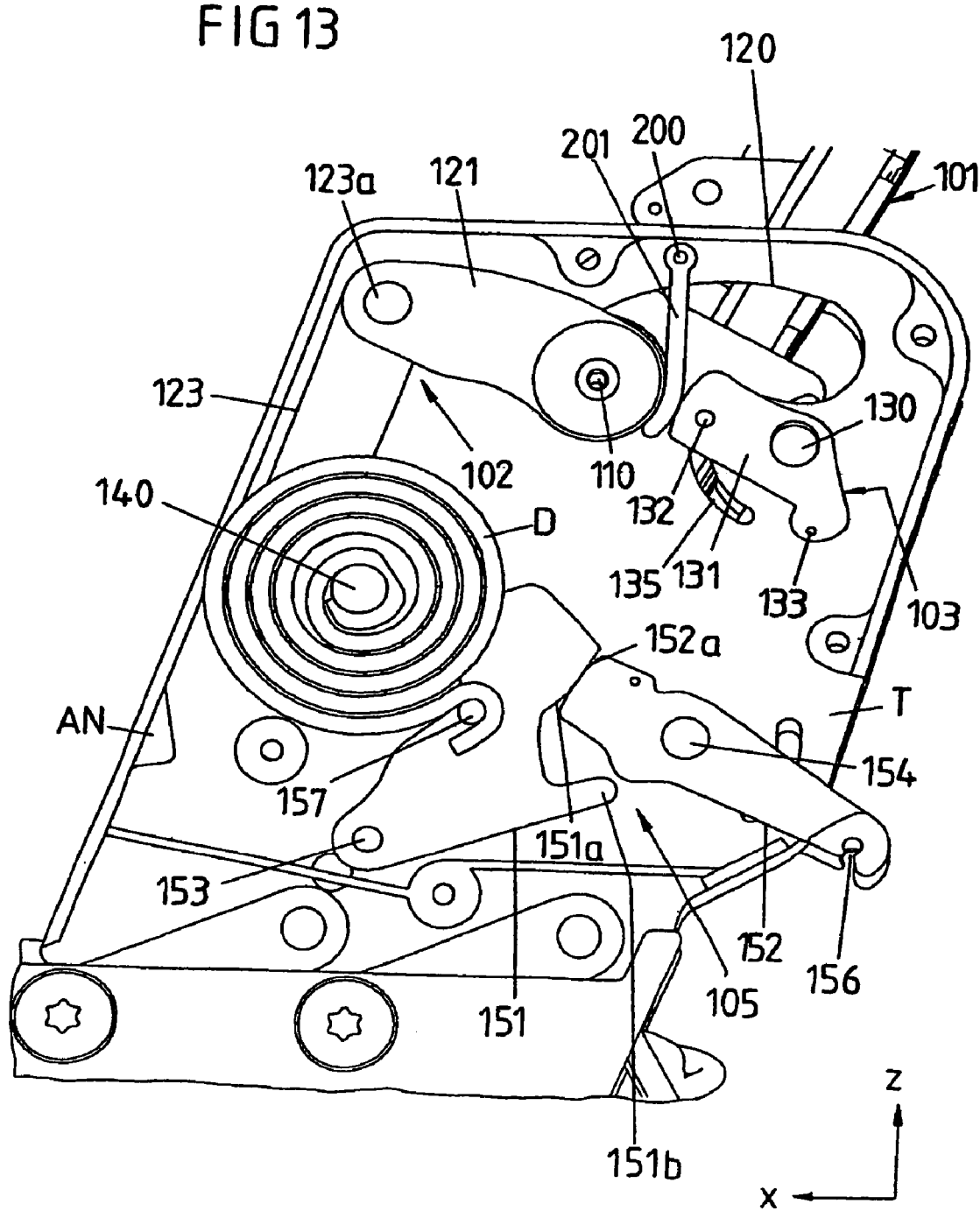

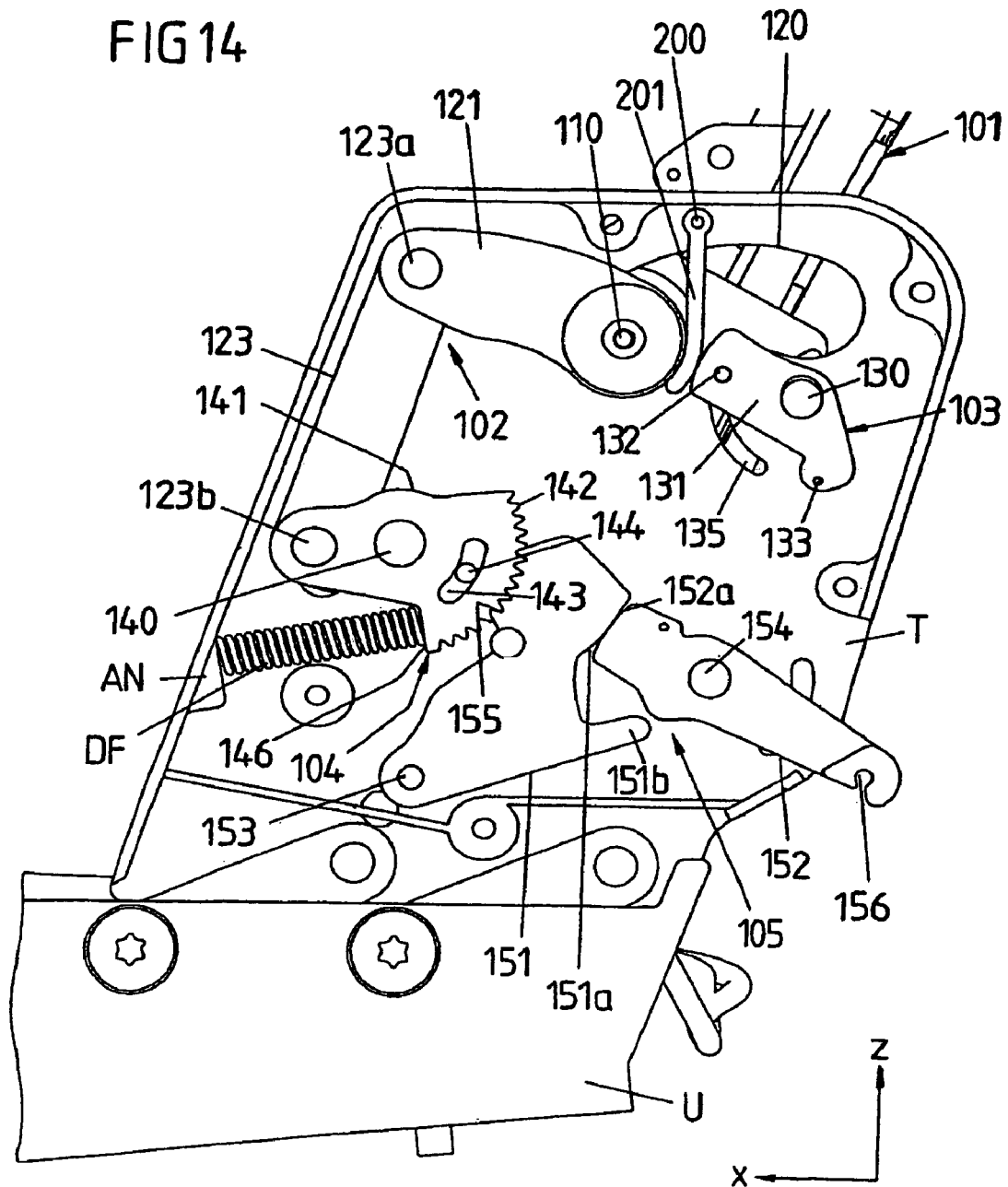

SEAT ASSEMBLY FOR A MOTOR VEHICLE SEAT

CROSS-REFERENCE TO RELATED APPLICATION

This application is a National Phase Patent Application of International Application Number PCT/DE2003/003143, filed on Sep. 16, 2003, which claims priority of German Patent Application Numbers 202 15 321.5, 102 46 473.1, and 103 37 682.8, filed respectively on Sep. 27, 2002, Sep. 27, 2002, and Aug. 11, 2003.

The invention relates to a seat assembly for a motor vehicle seat.

BACKGROUND

A seat assembly comprises a seat frame which defines a seat surface for a motor vehicle occupant, and a backrest which is coupled pivotably to a frame subassembly of the seat and can be folded about a pivot axis onto the seat surface.

A seat arrangement of this type can serve both for forming a front seat and for forming a rear seat of a motor vehicle. It permits the backrest of the corresponding motor vehicle seat to be folded forward onto the seat surface in order to provide additional storage space. As a rule, the corresponding seat surface is formed by a seat cushion which is arranged on the seat frame. The seat frame therefore defines the seat surface insofar as it determines the position of the seat cushion. However, the seat surface is not formed by the seat frame itself, but rather by the seat cushion.

In the case of a seat assembly of the type mentioned at the beginning, there is the problem that when it is folded forward the backrest may collide with the windshield, in particular via a head restraint provided on the backrest, (in the case of a front seat) or with the backrest of another seat (in the case of a rear seat).

It is therefore necessary, before the backrest is folded forward onto the seat surface, to remove the head restraint from the backrest and to deposit it at a separate location. This considerably impairs the ease with which a seat assembly having a backrest which can be folded forward is operated.

The invention is therefore based on the problem of improving a seat assembly of the type mentioned at the beginning in respect of the ease with which it is operated.

SUMMARY

According to the invention the pivot axis of the backrest is moved (displaced) along a predetermined path when the backrest is folded forward onto the seat surface, so that it changes its spatial position.

This path can be selected in such a manner that a collision of the backrest of the corresponding vehicle seat with other vehicle components is avoided, in particular by the path being selected in such a manner that, when the backrest is folded forward, the upper edge of the backrest (and therefore also a head restraint arranged on the upper edge of the backrest) are moved along a curve which rules out a collision with other vehicle components.

In this case, the pivot axis of the backrest can be formed by a physical subassembly, i.e. it is not a merely virtual pivot axis, but on the contrary a bearing spindle via which the backrest is mounted pivotably on a frame subassembly of the motor vehicle seat.

When the backrest is folded forward, this pivot axis is positively guided along the predetermined path by means of a guide device, for example in the form of a guide slot, in such a manner that the desired movement of the upper edge of the backrest is achieved.

As an alternative to a guide device which extends along the predetermined path for the movement of the pivot axis, the pivot axis may also be guided by the provision of a long stretched-out guide element via which the pivot axis is connected to the associated frame subassembly and which, when the backrest is folded forward, is moved in such a manner that the pivot axis moves on the predetermined curved path.

A suitable element of this type is, in particular, a guide lever which is coupled pivotably to the frame subassembly.

In order to ensure a defined movement of the pivot axis when the backrest is folded forward, the backrest can additionally be connected to the frame subassembly in a section spaced apart from its pivot axis (bearing spindle), for example via a coupling element in the form of a coupling lever which extends from the backrest to the frame subassembly. As an alternative, the additional coupling of the backrest and frame subassembly can take place via a guide device in the form of a guide slot in which a section, spaced apart from the pivot axis, of the backrest is guided when it is folded forward.

According to one variant of the invention, the pivot axis is moved on a closed path when the backrest is folded forward, with the result that, after the backrest is completely folded forward, the pivot axis is again at the same point as before the folding movement started. This may also be achieved by the fact that the pivot axis is moved from one end to the other end of an open curved path and back again to the first end of this curved path when the backrest is folded forward.

According to one development of the invention, means are provided for locking the pivot axis in the position which corresponds to a backrest swung up into a use position, and/or in the position which the backrest assumes after being folded forward onto the seat surface. Accordingly, the pivot axis can be locked in both end positions of the backrest, i.e. both in the use position existing before the backrest is folded forward onto the seat surface and in the position existing after the backrest is folded forward onto the seat surface. A backrest swung up into a use position is understood here as meaning a position of the backrest in which the latter is suitable for supporting the back of a person sitting on the corresponding vehicle seat and is not folded forward onto the seat surface to provide transportation space.

An example of a suitable locking means is a pivotably mounted locking lever.

According to a further embodiment of the invention, an adjusting device, by means of which the inclination of the swung-up backrest can be adjusted between various use positions, is additionally provided. This adjusting device does not therefore serve for folding the backrest forward onto the seat surface, but rather for being able to somewhat change the angle of inclination of the swung-up backrest in order to be able to adapt it to the individual requirements of a vehicle occupant. In this case, however, the backrest always remains in a position in which it is suitable for supporting the back of a person on the corresponding vehicle seat.

This adjustment of the inclination of the backrest can take place, depending on the configuration of the adjusting device provided for this, directly onto the backrest itself by manual action or by means of a drive, if appropriate an electric drive, coupled to the backrest.

In order to fix a previously adjusted inclination of the backrest, a locking device may be provided which can be formed, on the one hand, by a self-locking configuration of the adjusting device provided for adjusting the inclination of the backrest or a brake interacting with said adjusting device or, on the other hand, by separate locking means, in particular if the adjustment of the inclination of the backrest is to take place by means of direct manual action on the backrest. Separate locking means of this type may comprise a primary locking element which acts on the backrest in order to fix it, and a secondary locking element which blocks the primary locking element in a position in which it brings about the fixing of the backrest. The secondary locking element can furthermore serve to disengage the primary locking element from the backrest if the adjustment of the inclination of the backrest is to be changed.

According to another aspect of the invention, a seat assembly for a motor vehicle has a seat frame which defines a seat surface for a motor vehicle occupant and extends in the longitudinal direction of the seat, and a backrest which is arranged on a frame subassembly of the corresponding motor vehicle seat, the backrest being displaceable with respect to the seat frame in the longitudinal direction of the seat by means of a lever arrangement.

This firstly enables the seat cushion depth to be matched to the individual requirements of a motor vehicle occupant and secondly enables additional storage space to be provided behind the corresponding vehicle seat by displacing the backrest forward.

The longitudinal direction of the seat, along which the seat frame extends, is understood here as meaning that direction along which the thighs of a person situated on the corresponding vehicle seat extend. With reference to the installed state of the seat in a motor vehicle, this corresponds to the longitudinal direction of the vehicle (direction of travel).

The longitudinal displaceability of the backrest can additionally be achieved by a longitudinal guide, for example in a form of a guide slot, in which the lever arrangement, in particular a pair of articulated levers in the form of a parallelogram arrangement, is guided.

The means for displacing the backrest in the longitudinal direction of the seat can act on the frame subassembly to which the backrest is coupled in a manner such that it can folded forward and/or adjusted in inclination. This enables the longitudinal displaceability of the backrest to be combined with the adjustment of the inclination and/or with the possibility of folding the backrest forward.

According to a further aspect of the invention, the seat assembly has a pivotably mounted backrest which can be adjusted in its inclination and has a front side serving to support the seat user's back, and a spring arrangement having at least one elastic element with which the backrest is prestressed elastically in such a manner that it has the tendency to tilt forward and lean with its front side against the seat user's back. The inclination of this backrest can be adjusted counter to the action of the spring arrangement by the application of force to the front side of the backrest. That is to say, in the released state of the inclination-adjusting means, the backrest, under the action of the spring arrangement, automatically assumes its frontmost use position in which it serves to support a vehicle occupant's back and, under the action of a compressive force applied, for example, by the seat user's back, can be pivoted into a use position, in which it is inclined rearward to a greater extent, and can be locked in this position by means of a locking device.

In this case, the spring arrangement acts on a gear element which is operatively connected to the backrest and which is assigned a locking device with which the gear element can be locked in a plurality of different positions.

This design is based on the technical principle of not allowing the spring element, with which the backrest is prestressed in the direction of a forwardly inclined position, to engage on the backrest itself, but rather on a gear element which is connected to the backrest either directly or indirectly via further parts of a gear arrangement. This firstly permits a transmission of the torque acting on the gear element owing to the prestressing force of the spring arrangement, with the result that the torque which acts on the backrest itself and which has the tendency to pivot the backrest forward, can be set in a specific manner through selection of the transmission ratio.

An important advantage also resides in the fact that since the spring arrangement acts indirectly on the backrest (via at least one gear element), the usually possible folding of the backrest forward onto the seat surface and subsequent folding of it back into a use position is not influenced by the action of the spring element. In particular, it is not necessary to overcome the prestressing force of the spring arrangement when folding the backrest back out of its position folded forward onto the seat surface into an upright use position (if appropriate somewhat inclined with respect to the vertical). The folding of the backrest forward can take place, on the one hand, in order to provide additional transportation space in the region of the corresponding motor vehicle seat or, on the other hand, to trigger an "easy-entry mechanism" which, in the case of two-door motor vehicles, is intended to facilitate entry to one of the rear seats by enabling the vehicle seat together with the backrest folded forward to be displaced in the longitudinal direction of the seat into a front position.

The gear element on which the spring arrangement acts is preferably operatively connected here to the backrest in such a manner that, in the locked state of the locking device assigned to the gear element, the backrest is also locked at the same time in its particular pivoting position (inclination with respect to the vertical) and that, in the unlocked state of the locking device, the inclination of the backrest can be adjusted, specifically either forward under the action of the spring arrangement or rearward counter to the action of the spring arrangement.

In this case, the gear element may form part of a gear arrangement, in particular a lever arrangement, via which the spring arrangement is operatively connected to the backrest. Appropriate configuration of the gear arrangement enables a desired transmission ratio to be set for the transmission to the backrest of the movement exerted on the gear element by the spring arrangement.

In one particularly preferred development of the invention, the at least one gear element is assigned a coupling by means of which the backrest can be decoupled from the gear element in such a manner that the backrest can be folded forward in the direction of the seat surface of the motor vehicle seat without the gear element being moved. This means firstly that the backrest, given appropriate actuation of the coupling, is coupled from the spring arrangement acting on the gear element, so that the spring element does not act on the backrest when the backrest is folded forward onto the seat surface and when the backrest is subsequently folded back into a use position.

According to one variant of the invention, the decoupling of the backrest from the gear element is made possible by the fact that the pivot axis of the backrest, when the backrest is folded forward onto the seat surface (and likewise when it is subsequently folded back into a use position), is guided along a path which is predetermined for the pivot axis by a guide device and which is selected in such a manner that the movement of the pivot axis along the path enables an otherwise possible reaction of the pivoting movement of the backrest on the gear element to be compensated for (neutralized).

According to another variant of the invention, the gear element is completely disengaged from the backrest when the coupling device is actuated, so that the gear element is connected to the backrest neither directly nor indirectly (via further structural elements). This variant of the invention can be realized, for example, by the gear element (and, if appropriate, further elements of the gear arrangement via which the gear element is connected to the backrest) being arranged on a baseplate which can be moved, in particular can be pivoted about an axis, in such a manner that the gear element becomes disengaged from the backrest. In this case, the baseplate is preferably prestressed elastically in the direction of the state in which the gear element is connected to the backrest, and has to be moved (pivoted) counter to this prestressing in order for the gear element and backrest to be disengaged.

In order to move, i.e. in particular to pivot, the baseplate, an adjusting element, which interacts with the baseplate and is in the form of an adjusting lever guided in a slot of the baseplate, is provided.

In one development of the invention, blocking means are furthermore provided with which the coupling can be locked both in the state in which the gear element is coupled to the backrest and in the state in which the gear element is decoupled from the backrest.

In the variant of the invention mentioned first, the blocking means are preferably formed by a pivotably mounted locking lever which, in the locked state, acts on the pivot axis and prevents its movement along the path defined by the guide device.

In the second variant of the invention, the blocking means are preferably formed by the above-described adjusting element in the form of an adjusting lever which also serves to move (pivot) the baseplate and is prestressed in the direction of the locked state, preferably by means of an elastic element.

The locking device assigned to the gear element can be formed in a known manner by a "primary locking element" which, in the locked state, blocks a movement of the gear element, and by a secondary locking element which, in turn, blocks the primary locking element in the locked state and, in order to unlock the locking device, has to be actuated counter to a prestressing force or another force acting in the direction of the locked state.

In one preferred embodiment of the invention, the gear element, on which the spring arrangement assigned to the backrest acts according to the invention, is formed by a toothed segment lever, the toothing of which can be brought into engagement with an associated toothing of the primary locking element.

BRIEF DESCRIPTION OF DRAWINGS

Further features and advantages of the invention will become clear in the following description of an exemplary embodiment with reference to the figures, in which:

FIG. 1 shows a schematic illustration of a motor vehicle seat with an inclination-adjustable backrest which can also be folded forward onto the seat surface of the motor vehicle seat;

FIGS. 2a, 2b show details of a device for adjusting the inclination of the backrest from FIG. 1;

FIG. 6 shows an arrangement with a device for folding a backrest, which cannot be adjusted in inclination, forward;

FIG. 7 shows a further modification of the device, illustrated in FIGS. 3a and 3b, for folding the backrest forward;

FIGS. 8a, 8b show a device for displacing a backrest of a motor vehicle seat in the longitudinal direction of the seat;

FIGS. 9a, 9b show a combination of a device for adjusting the inclination of a backrest of a motor vehicle seat together with a device for folding the backrest forward onto the seat surface and a device for displacing the backrest in the longitudinal direction of the seat;

FIG. 13 shows an illustration of a detail of the motor vehicle seat from FIGS. 12a and 12b in the region in which the backrest is connected to the seat frame so as to illustrate the means which permit the adjustment of the inclination and the folding of the backrest forward;

FIG. 14 shows a modification of the exemplary embodiment from FIG. 13 with respect to the means which permit the adjustment of the inclination and the folding of the backrest forward about a variable pivot axis.

Figure 3B:
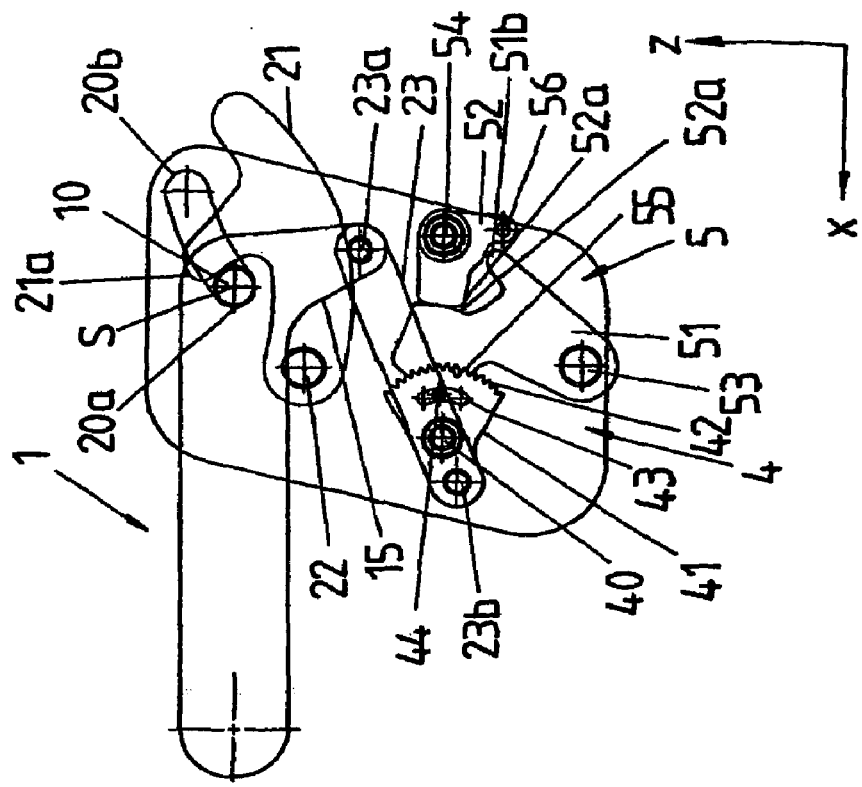
FIGS. 3a, 3b shows details of a device for folding the backrest from FIG. 1 forward onto the seat surface.

In all the figures, the individual components of a seat assembly are in each case illustrated transparently.

DETAILED DESCRIPTION

FIG. 1 illustrates a backrest R of a motor vehicle seat with a head restraint K in an upright use position, on the one hand, and in an essentially horizontal position in which it is folded forward onto a seat surface F, on the other hand. The seat surface F is formed by a seat cushion on a seat frame.

The backrest R can firstly be adjusted in its inclination N between various use positions. These use positions are distinguished in each case by the fact that the backrest is suitable in the particular use position to support the back of a person on the corresponding motor vehicle seat. With reference to the installed state of a motor vehicle seat in a motor vehicle, the range of use usually extends from the vertical orientation of the backrest R (along the vertical vehicle axis z) to a backrest R inclined rearward to a great extent.

In addition, the backrest R can be folded forward in the direction of the seat surface F, which is formed by the seat cushion arranged on the seat frame, in order to provide additional transportation space in the vehicle. This is in particular of importance in the case of a rear seat, as is illustrated in FIG. 1.

When the backrest R of a rear seat is folded forward, there is the problem that the upper side of the backrest or the head restraint K arranged thereon may collide with the backrest of a front seat V. This becomes clear with reference to the curve A, which is illustrated by dashed lines in FIG. 1 and illustrates the movement of the upper side of the head restraint K when the backrest R is pivoted about a defined axis in the lower region of the backrest. It can be seen that this curve A intersects the backrest of the front seat V. This means that the backrest R of the rear seat can be folded forward onto the seat surface F only if the head restraint K has been removed beforehand. This reduces the ease of operating the device for folding the backrest R forward.

According to the invention, the device for folding the backrest R forward onto the seat surface F is now configured in such a manner that the pivot axis about which the backrest R is pivoted when it is folded onto the seat surface F is moved in such a manner during the process of folding the backrest forward that a collision of the upper edge of the head restraint K with the front seat V is avoided.

A corresponding curved path B of the upper edge of the head restraint K is illustrated in FIG. 1 by a solid line. It can be seen that, during the folding of the backrest forward, the pivot axis is first of all moved, on the one hand, upward (along the vertical vehicle axis z) and, on the other hand, rearward (counter to the longitudinal axis x of the vehicle). This enables the corrected curved path B to be displaced somewhat upward (along the vertical vehicle axis z) and somewhat rearward (counter to the longitudinal direction x of the vehicle) in relation to the original curved path A (which arises when the backrest is folded over about a fixed pivot axis). This prevents a collision of the upper edge of the head restraint K with the backrest of the front seat V.

In addition, the backrest R of the vehicle seat illustrated in FIG. 1 can be displaced with respect to the seat frame U and the seat surface F in the longitudinal direction L of the seat. In this case, the longitudinal direction L of the seat is defined as that region along which the seat frame and the seat cushion, which is arranged thereon and forms the seat surface F, extend. When a vehicle seat is installed in a motor vehicle, the longitudinal direction L of the seat corresponds to the longitudinal direction x of the vehicle. That is to say, the longitudinal direction L of the seat corresponds to that direction along which a vehicle seat can usually be displaced by means of a longitudinal adjustment of the seat.

The displacement of the backrest R in the longitudinal direction L of the seat (or longitudinal direction x of the vehicle) with respect to the seat frame and the seat surface F can serve different purposes: firstly, this enables the seat cushion depth to be adjusted in order to adapt it to the individual requirements of a vehicle occupant. Secondly, displacement of the backrest R forward in the longitudinal direction L of the seat enables additional storage space to be obtained behind the backrest R. Conversely, displacement of the backrest R rearward can additionally help the backrest R, when it is folded forward, not to collide with the front seat V.

The subassemblies 1, 2, 3, 4, 5 of the motor vehicle seat illustrated in FIG. 1, which subassemblies permit the inclination of the backrest to be adjusted, the backrest to be folded forward onto the seat surface and the backrest to be displaced in the longitudinal direction of the seat, will be explained in greater detail below with reference to FIGS. 2*a* to 9*b*.

FIG. 2*a* shows a backrest fitting 1 to which the backrest R, illustrated in FIG. 1, of a motor vehicle seat can be fastened and which has, in the region of its lower end along the vertical vehicle axis z, a bearing pin 10 via which it is mounted pivotably on a frame subassembly 2 in the form of a supporting plate of the seat assembly. The bearing pin 10 of the backrest fitting 1 is mounted pivotably in a guide slot 20 of the supporting plate 2, so that the bearing pin 10 and therefore the pivot axis S of the backrest fitting 1 can be moved between a first end 20*a* and a second end 20*b* of the guide slot by displacement along the guide slot 20.

In the state illustrated in FIG. 2*a*, such a movement of the bearing pin 10 along the guide slot 20 is prevented by a locking lug 21*a* of a locking lever 21 which is mounted pivotably about a bearing point 22 of the supporting plate 2, engages over the bearing pin 10 and, as a result, blocks the movement thereof along the guide slot 20.

The backrest fitting 1 furthermore has an extension 15 via which the backrest fitting 1 is coupled at a distance from the bearing pin 10 to an adjusting rocker 41 of a device 4 for adjusting the inclination of the backrest fitting 1, by means of a coupling lever 23. For this purpose, the coupling lever 23 is connected in an articulated manner at its one, upper end 23*a* to the extension 15 of the backrest fitting 1 and at its other, lower end 23*b* to the adjusting rocker 41. The adjusting rocker 41 can be pivoted about a bearing point 40 provided on the supporting plate 2 and has an external toothing 42 which is in engagement with a locking device 5 in such a manner that a pivoting movement of the adjusting rocker 41 is not possible in the state illustrated in FIG. 2*a*.

The adjusting rocker 41 also has a slotted guide 43 in which a pin 44 provided on the supporting plate 2 engages and which therefore serves to limit the possible pivoting range of the adjusting rocker 41.

The locking device 5 assigned to the adjusting rocker 41 comprises a primary locking element 51 which, as locking lever, can be pivoted about a bearing point 53 provided on the supporting plate 2 and which has a toothing region 55 which engages in the toothing region 42 of the adjusting rocker 41 in order to lock the latter. The primary locking element 51 is assigned a secondary locking element 52 which is likewise designed as a locking lever, can be pivoted about a further bearing point 54 and bears with a stop 52*a* against an assigned stop 51*a* of the primary locking element 51 and thereby prevents a pivoting movement of the primary locking element 51 that would release the toothing of the adjusting rocker 41.

The secondary locking element 52 is provided with a force application point 56 at which a force can be introduced leading to a pivoting of the secondary locking element 52, with the result that the mutually assigned stops 51*a*, 52*a* of the two locking elements 51, 52 become disengaged. For triggering the corresponding pivoting movement of the secondary locking element 52 use can be made of any desired physical or technical principles, for example an actuator in the form of a solenoid or an electric motor or alternatively a manual actuating device, etc.

The primary locking element 51 is preferably preloaded by means of an elastic element, not illustrated in FIG. 2*a*, in such a manner that, after the pivoting of the primary locking element, it is automatically rotated about its pivot axis 53 such that it releases the toothing of the adjusting rocker 41, cf. FIG. 2*b*. As an alternative, when the secondary locking element 52 is pivoted, it can act on an extension 51*b* of the primary locking element 51 and, as a result, bring about a pivoting movement of the primary locking element 51 by means of which the toothing 55 thereof is disengaged from the assigned toothing 42 of the adjusting rocker 41.

In the state illustrated in FIG. 2*b*, a change in the inclination of the backrest fitting 1 and therefore of the backrest R can now be undertaken by the fact that a force is exerted manually directly on the backrest itself. This enables the inclination of the backrest fitting 1 to be reset on the basis of a pivoting movement about the pivot axis S, which is defined by the bearing pin 10. The pivot axis S does not move in this case, since the bearing pin 10 is fixed at the first end 20a of the guide slot 20 by means of the locking lug 21a of the locking lever 21. The setting of the inclination of the backrest R therefore takes place by means of a pivoting movement about the positionally fixed axis S.

After the adjusting movement is finished, the current setting of the inclination of the backrest fitting 1 is then fixed by means of the locking device 5 by the secondary locking element 52 being pivoted again into the position in which it acts on the primary locking element 51 in such a manner that the latter locks the adjusting rocker 41, which is coupled to the backrest fitting 1 via the coupling lever 23.

Figure 3A:
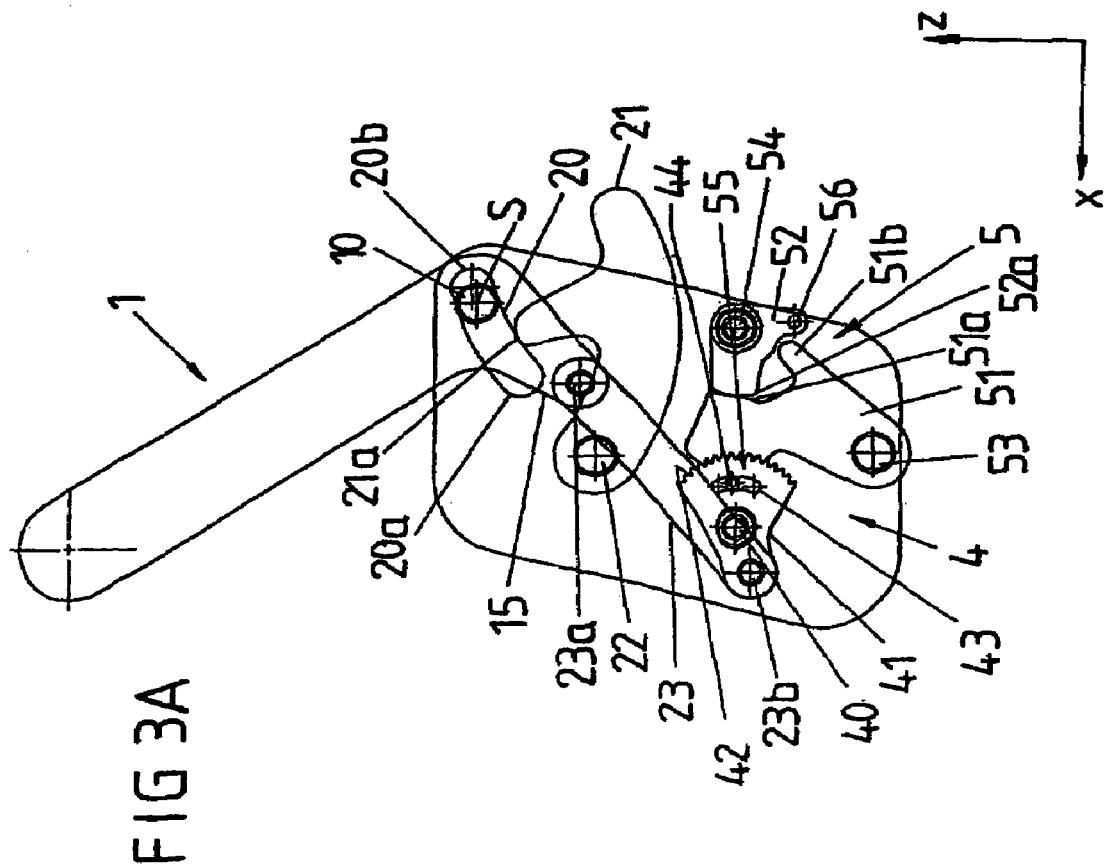

FIGS. 3a and 3b illustrate the manner in which the arrangement explained with reference to FIGS. 2a and 2b enables the backrest fitting 1 to be folded forward, so that the backrest R is folded forward onto the seat surface F, cf. FIG. 1.

FIG. 3a shows the arrangement in a state in which the backrest fitting has scarcely covered half of its travel when being folded forward onto the seat surface, and FIG. 3b shows the completely folded-forward backrest fitting 1.

The folding-forward of the backrest fitting 1 is made possible by the locking lug 21a having first of all been disengaged from the bearing pin 10, which forms the pivot axis S of the backrest fitting 1, by the locking lever 21 being pivoted about its pivot axis 22, cf. FIG. 3a. The pivoting movement of the locking lever 21 which this requires can be triggered manually or under actuation by an external force (e.g. electrically) using a suitable actuator.

After the bearing pin 10 and therefore the pivot axis S have been released, the backrest R (cf. FIG. 1) can now be folded forward together with the backrest fitting 1 in the direction of the seat surface F of the vehicle seat by the backrest R being grasped by a person and being moved toward the seat surface F. During this folding movement of the backrest R and of the backrest fitting 1, the bearing pin 10, which defines the respectively current pivot axis S of the backrest fitting 1 when it is folded forward, moves in the guide slot 20 between the first stop 20a thereof and the second stop 20b thereof.

The movement of the bearing pin 10 in the guide slot 20 is controlled by the coupling lever 23, via which the backrest fitting 1 is coupled outside its pivot axis S to the adjusting rocker 41. Since, when the backrest or the backrest fitting 1 is folded forward, the adjusting rocker 41 is locked by means of the assigned locking device 5, the backrest fitting 1, when being folded forward, is coupled via the coupling lever 23 to an element which is fixed on the frame (cannot be moved with respect to the supporting plate 2).

Under the action of the coupling lever 23 on the backrest fitting 1, when the backrest fitting is folded forward the bearing pin 10 of the backrest fitting 1 moves from the first end 20a to the second end 20b of the guide slot 20 and then back again to the first end 20a. When the backrest fitting 1 is completely folded forward, the bearing pin 10 and the pivot axis S are therefore situated again at the same position as at the start of the folding movement. This is also clear with reference to FIG. 1, according to which the two curves A (corresponding to the backrest R being folded forward with a positionally secured pivot axis) and B (corresponding to the backrest R being folded forward with a spatially variable pivot axis) coincide in each case at the beginning of the folding movement (with the backrest set upright) and at the end of the folding movement (with the backrest completely folded forward).

The transition from the curved path A, which is illustrated by dashed lines in FIG. 1 (folding movement with spatially fixed pivot axis) to the curved path B, which is illustrated by a solid line (with spatially variable pivot axis), the curved path B mentioned second being offset upward (along the vertical vehicle axis z) and rearward (counter to the longitudinal axis x of the vehicle) in relation to the curved path A first mentioned, is achieved by the guide slot in the supporting plate 2 extending obliquely upward and rearward from its first end 20a to its second end 20b, i.e. by it having a component along the vertical vehicle axis z and counter to the longitudinal axis x of the vehicle. Outside the two end points of the folding movement, the bearing pin 10 and the pivot axis S are therefore always situated above and behind the position that they have taken up at the beginning of the folding movement. That position is in turn defined by the fact that the bearing pin 10 bears against the first, front/lower stop 20a of the guide slot 20 before the beginning of the folding movement.

In particular, when the backrest R is folded forward, the pivot axis S is moved, at least during the first part of the folding movement, along a direction (with one component rearward counter to the longitudinal axis x of the vehicle and one component upward along the vertical vehicle axis z) which is essentially opposed to the direction of the folding movement (with one component forward along the longitudinal axis x of the vehicle and one component rearward counter to the vertical vehicle axis z).

Starting from the first stop 20a of the guide slot 20, the further movement of the bearing pin 10 in the guide slot 20 between the two stops 20a, 20b is controlled by the coupling lever 23. The guide slot 20 therefore defines the path along which the bearing pin 10 and the pivot axis S can be moved when the backrest fitting 1 is folded forward, and the coupling lever 23 determines the movement along this path.

By changing the geometry of the guide slot 20 and by varying the arrangement of the coupling lever 23, it is thus possible to produce any other desired paths along which the pivot axis S of the backrest fitting 1 can be moved, when the backrest fitting 1 is folded forward, in order to achieve a defined, desired movement of the backrest when it is being folded forward.

Figure 4:
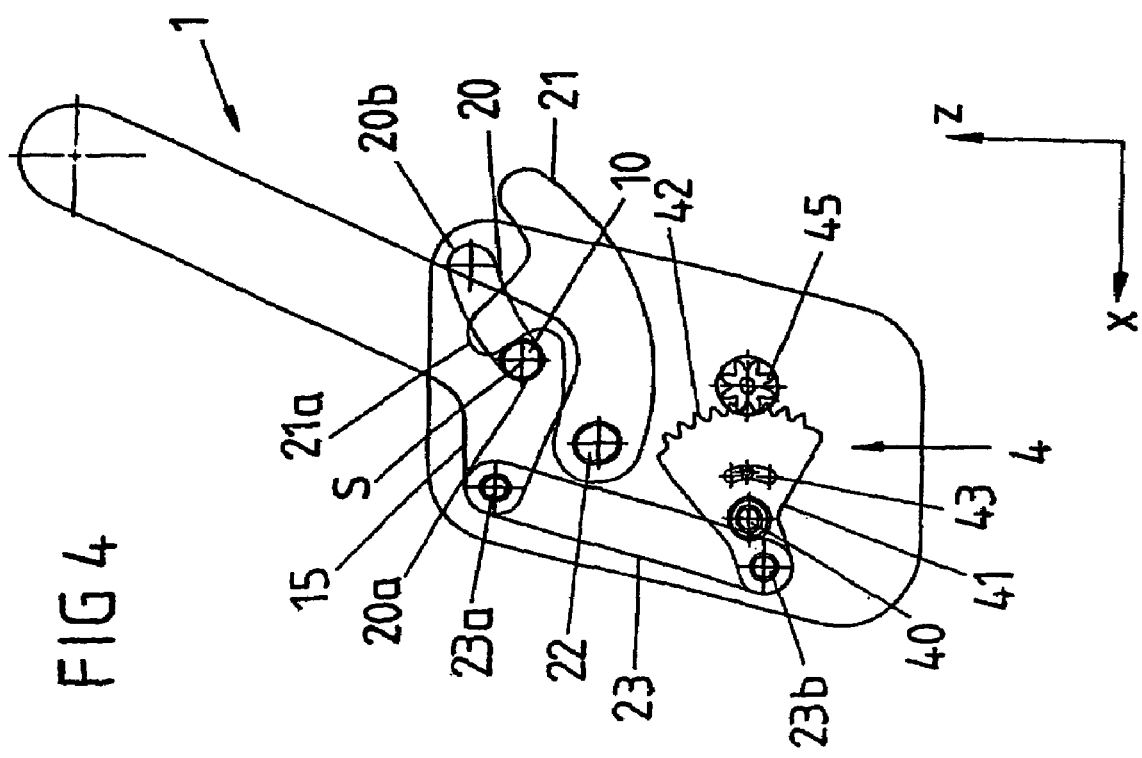
FIG. 4 shows a modification of the device, which is illustrated in FIGS. 2a and 2b, for adjusting the inclination of the backrest.

FIG. 4 shows a modification of the arrangement from FIGS. 2a to 3b with the effect of the adjusting rocker 41 interacting via its toothing 42 with a driving pinion 45 which can be rotated manually or under actuation by an external force (in particular an electric motor) in order to set the inclination of the backrest fitting. A rotational movement of the driving pinion 45 is converted into a pivoting movement of the adjusting rocker 41 about its pivot axis 40, which movement is transmitted via the coupling lever 23 to the backrest fitting 1 and therefore leads to a change in the setting of the inclination of the backrest fitting 1.

The locking of the backrest fitting 1 in a certain position of inclination can be achieved here by the driving device driving the driving pinion 45 being of self-locking configuration or being coupled to a separate braking device. In each case, the driving pinion 45 has to be prevented from moving in the event of a torque being applied on the output side, i.e. from the adjusting rocker 41.

Figure 5:
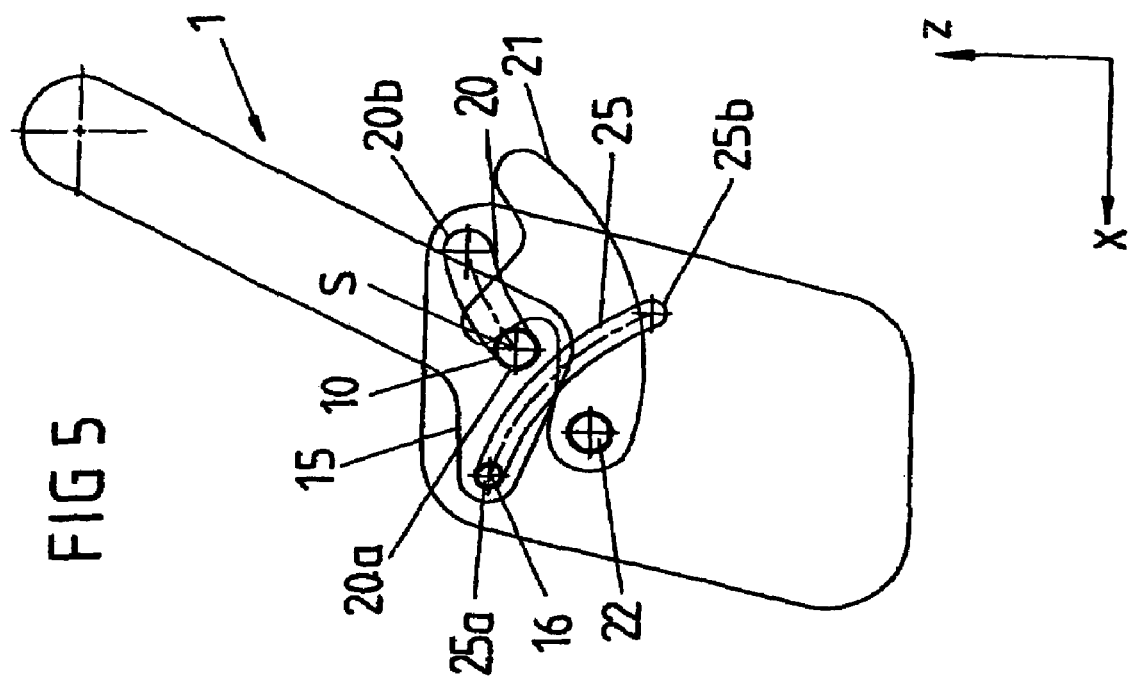
FIG. 5 shows a modification of the device, which is illustrated in FIGS. 3a and 3b, for folding the backrest forward.

FIG. 5 shows a further modification of the arrangement from FIGS. 2a to 3b. Firstly, in the case of the arrangement according to FIG. 5, a device is not provided for adjusting the inclination of the backrest fitting 1. The backrest fitting 1 can therefore only be folded forward here onto the seat surface, but cannot be adjusted in its inclination between different positions of use. An arrangement of this type is suitable in particular for use in the case of rear seats of motor vehicles.

Furthermore, the coupling lever 23 from FIGS. 2a to 3b, via which the backrest fitting 1 is coupled outside its pivot axis S to an element fixed on the frame, is replaced here by a control slot 25, in which the extension 15 of the backrest fitting 1 is guided between a first end 25a and a second end 25b by means of a guide element 16 provided on the extension 15. Like the coupling lever 23 from FIGS. 2a to 3b, the control slot 25 from FIG. 5 takes over the function of controlling the movement of the bearing pin 10 and of the pivot axis S in the guide slot 20.

FIG. 6 shows a third modification of the arrangement from FIGS. 2a to 3b, the sole difference being that a device for setting the inclination of the backrest between different positions of use has been omitted. Instead, the coupling lever 23 is coupled pivotably at its lower end 23b directly to the supporting plate 2.

In the case of the fourth embodiment, illustrated in FIG. 7, of the arrangement from FIGS. 2a to 3b, the guide slot 20 is replaced by a guide lever 27, which is arranged pivotably on a bearing point 28 of the supporting plate 2, and which is connected at its free end, which faces away from the bearing point 28, to the bearing pin 10 of the backrest fitting 1 in an articulated manner or holds said bearing pin in a rotatable manner. In this case, an additional device (not illustrated in FIG. 7) has to be provided for locking the guide lever 27 in one or both end positions which correspond to the backrest positioned in a position of use or to the backrest folded forward onto the seat surface. A stop 29 is provided here on the guide lever 27 and defines one end position when the guide lever 27 is pivoted and thereby takes on the function of the end stops of a guide slot.

In this exemplary embodiment, a movement of the bearing pin 10 or of the pivot axis S of the backrest fitting 1, when it is folded forward, is brought about by the fact that the guide lever 27 pivots about its axis formed by the bearing point 28. The control of this movement takes place, as in the exemplary embodiment according to FIG. 6, by the coupling lever 23, which is coupled directly to the supporting plate 2.

The arrangement from FIG. 7 therefore forms a four-bar linkage as the device for folding the backrest forward onto a seat surface.

FIGS. 8a and 8b show a further aspect of the invention, according to which the backrest R of a motor vehicle seat can be moved with respect to the seat frame and the assigned seat surface F in the longitudinal direction L of the seat (cf. FIG. 1) or longitudinal direction x of the vehicle. This is achieved in the present case by the frame subassembly (supporting plate 2), on which the backrest R is arranged, being displaceable in the longitudinal direction x of the vehicle.

The displaceability of the supporting plate 2 in the longitudinal direction x of the vehicle is made possible by the supporting plate 2 being connected in an articulated manner in the region of its end which is in front in the longitudinal direction x of the vehicle and in the region of its end which is at the rear in the longitudinal direction x of the vehicle to a floor subassembly 30 via a respective adjusting lever 31 or 32. The two adjusting levers 31, 32 form a parallelogram arrangement, as is also known for adjusting complete seat assemblies, and are coupled in each case by their upper end 31a or 32a to the supporting plate 2 and by their lower end 31b or 32b to the floor subassembly 30. Joint pivoting of the adjusting levers 31, 32, which are always aligned parallel here, enables the backrest R to be moved forward in the longitudinal direction of the vehicle (FIG. 8b) or to be moved rearward again (FIG. 8a).

If, during the adjustment of the backrest R in the longitudinal direction x of the vehicle, the height of the backrest R along the vertical vehicle axis z is to remain constant, the adjusting levers 31, 32 have to have in their second end position (FIG. 8b), as in their first end position (FIG. 8a), an identical inclination in the opposite direction to the vertical vehicle axis z. In this case, the adjusting device 3 formed by the adjusting levers 31, 32 can be used to set just two different longitudinal positions of the backrest R, as illustrated in FIGS. 8a and 8b.

If, by contrast, during the adjustment of the backrest R in the longitudinal direction x of the vehicle, a change in the position of the backrest along the vertical vehicle axis z also has to be accepted, then it is also possible for more than two positions to be set in the longitudinal direction x of the vehicle. It is then necessary for corresponding locking elements to be provided, for example in the form of latching elements, which permit the backrest R to be locked in the individual longitudinal positions.

In the case of the exemplary embodiment illustrated in FIGS. 8a and 8b, an adjustment of the backrest R in the longitudinal direction x of the vehicle only between the two end positions illustrated in FIG. 8a and FIG. 8b is provided. These end positions are in each case stable if corresponding limiting means, for example in the form of stops, or other locking means are provided which prevent a further pivoting of the adjusting levers 31, 32 beyond the particular end position or with which the adjusting levers 31, 32 can be locked in the particular end position.

The floor subassembly 30 can also be guided displaceably in the longitudinal direction x of the vehicle in a longitudinal guide.

FIGS. 9a and 9b show a combination of the adjusting device from FIGS. 8a and 8b together with the adjusting devices from FIGS. 2a to 3b. This enables an adjustment of the backrest fitting 1 in the longitudinal direction x of the seat, and a setting of the inclination N of the backrest fitting 1 and, in addition, a folding of the backrest fitting 1 forward in the direction of the seat surface of the corresponding vehicle seat. In this case, the two adjusting levers 31, 32 are coupled by their upper ends 31a, 32a to the bearing point 40 of the adjusting rocker 41 or the bearing point 54 of the secondary locking element 52.

Figure 10:
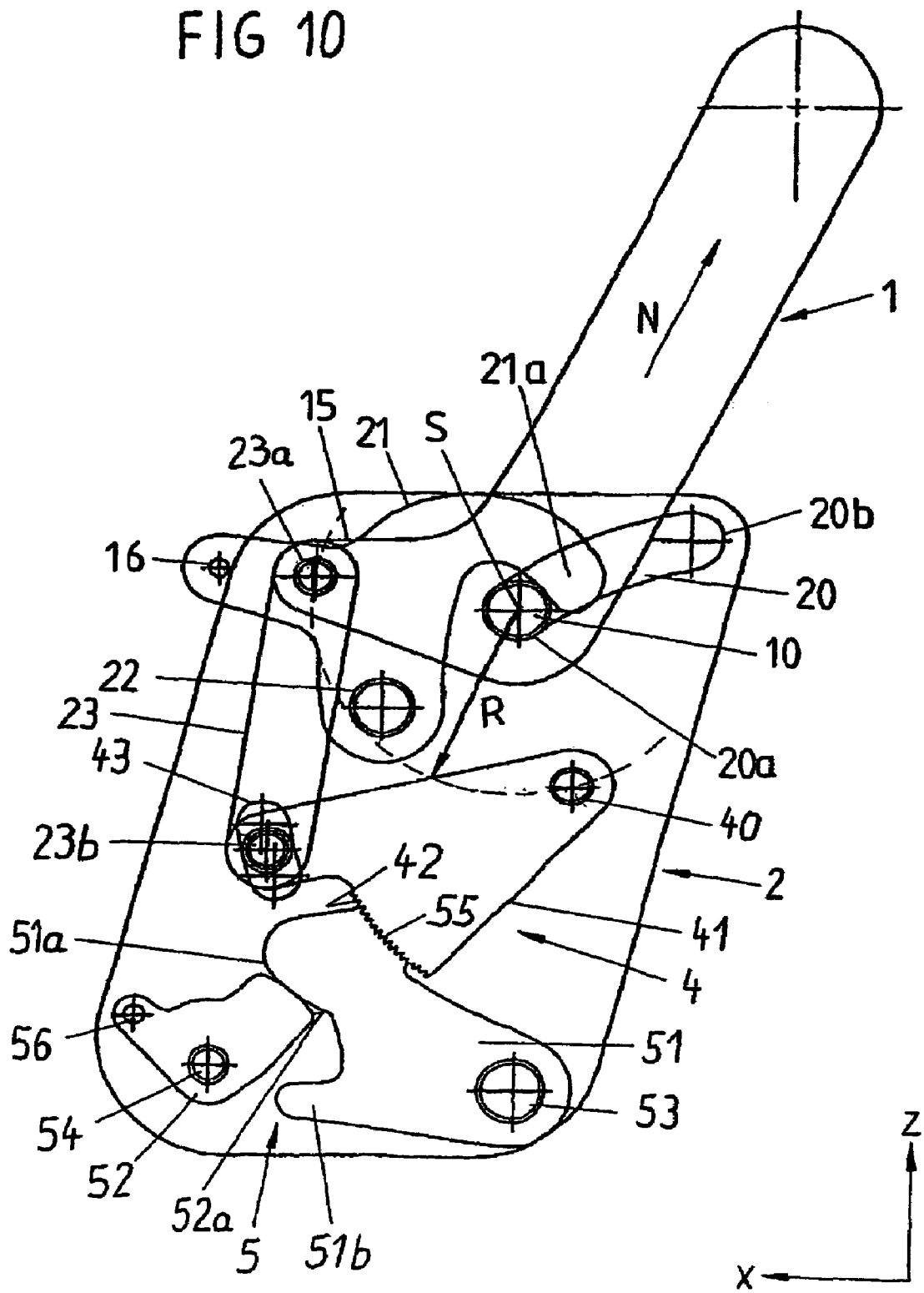
FIGS. 10-11c show a modification of the arrangement from FIGS. 2a-2b.

The arrangement illustrated in FIG. 10, which has a device 4 for adjusting the angle of inclination of the backrest in an upright position of use together with an assigned locking device 5, and a device for folding the backrest forward onto a seat surface, corresponds essentially to the arrangement illustrated in FIGS. 2a to 3b. Only the essential technical differences in this respect will be discussed below. In respect of the remaining components of the arrangement illustrated in FIG. 10 reference is made to the corresponding embodiments in FIGS. 2a to 3b, with corresponding structural elements or subassemblies in FIG. 10 being provided in each case with the same reference numerals as in FIGS. 2a to 3c.

It should first of all be noted that, in the case of the arrangement illustrated in FIG. 10, two structural elements, namely the backrest fitting 1 and the coupling lever 23, are arranged on another side of the supporting plate 2 (namely on its second side or rear side) to the remaining subassemblies, namely the locking lever 21, the adjusting rocker 41 and the locking device 5, which are in each case arranged on a first side (front side) of the supporting plate 2. The arrangement of the abovementioned subassemblies on different sides of the supporting plate 2 cannot be seen in FIG. 10, since in the present case the individual structural elements and subassemblies are in each case illustrated transparently in all of the figures. The arrangement of individual subassemblies on different sides of the supporting plate 2 is required in order to prevent a collision of the subassemblies during an adjusting operation.

In the case of the arrangement illustrated in FIG. 10, it is of significance that the axis formed by the coupling point 23a of the coupling lever 23 on the extension 15 of the backrest fitting 1 and the axis formed by the bearing point 40 of the adjusting lever 41 lie on a circular path, the center point of which is formed by the pivot axis S of the backrest fitting 1, and which has a defined radius R with respect to this center point.

Figure 11A:
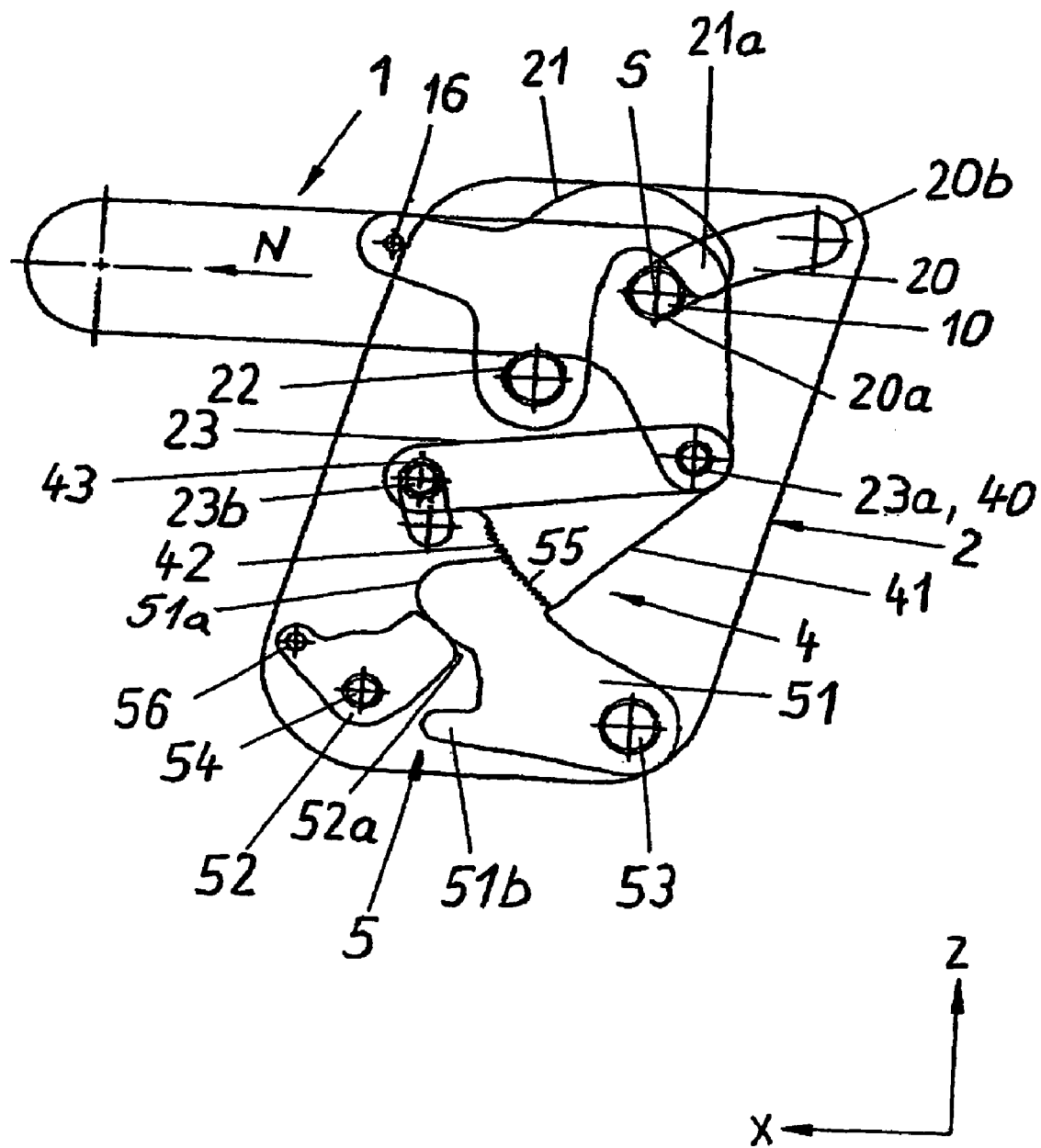
Figure 11B:
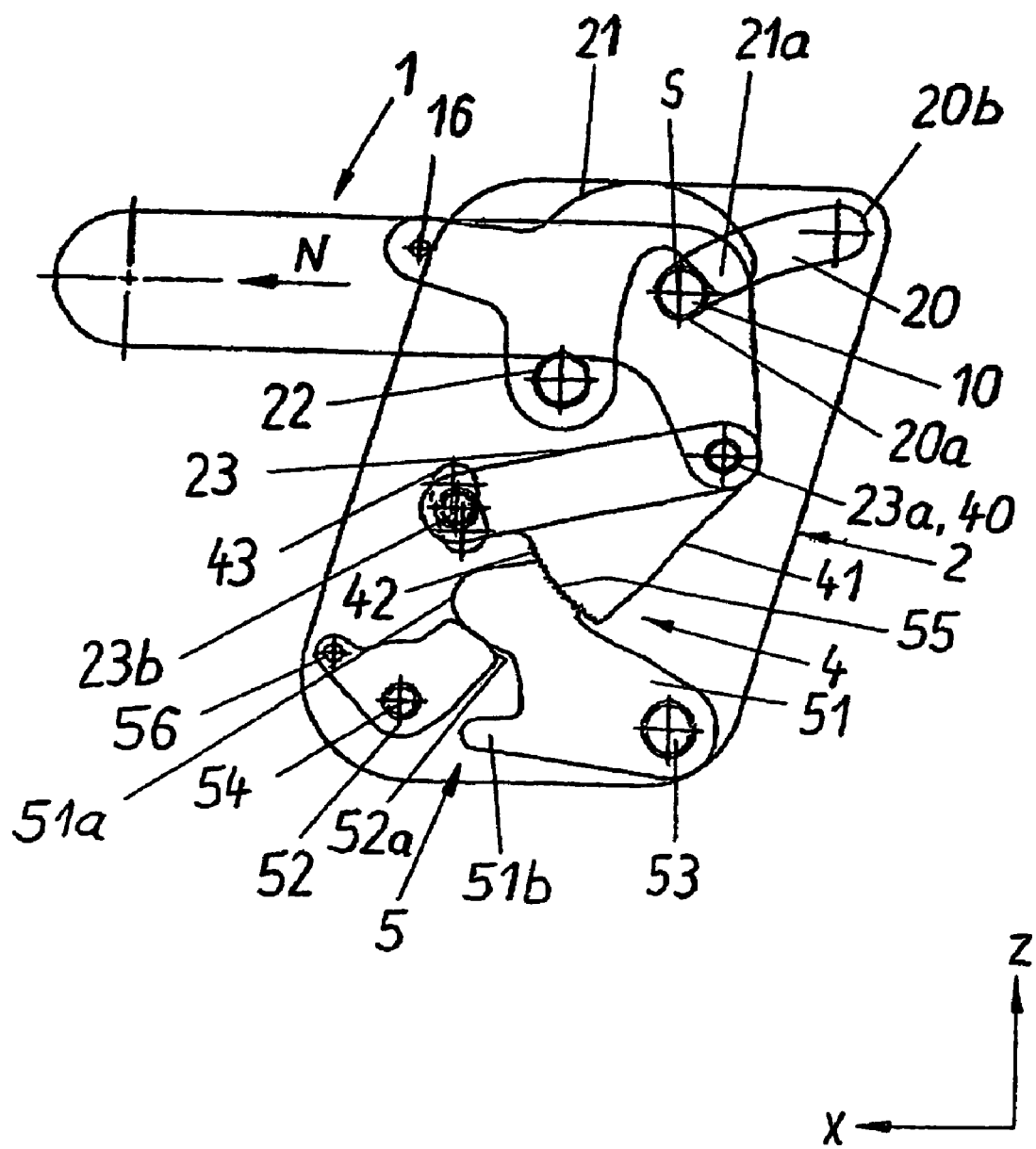
Figure 11C:
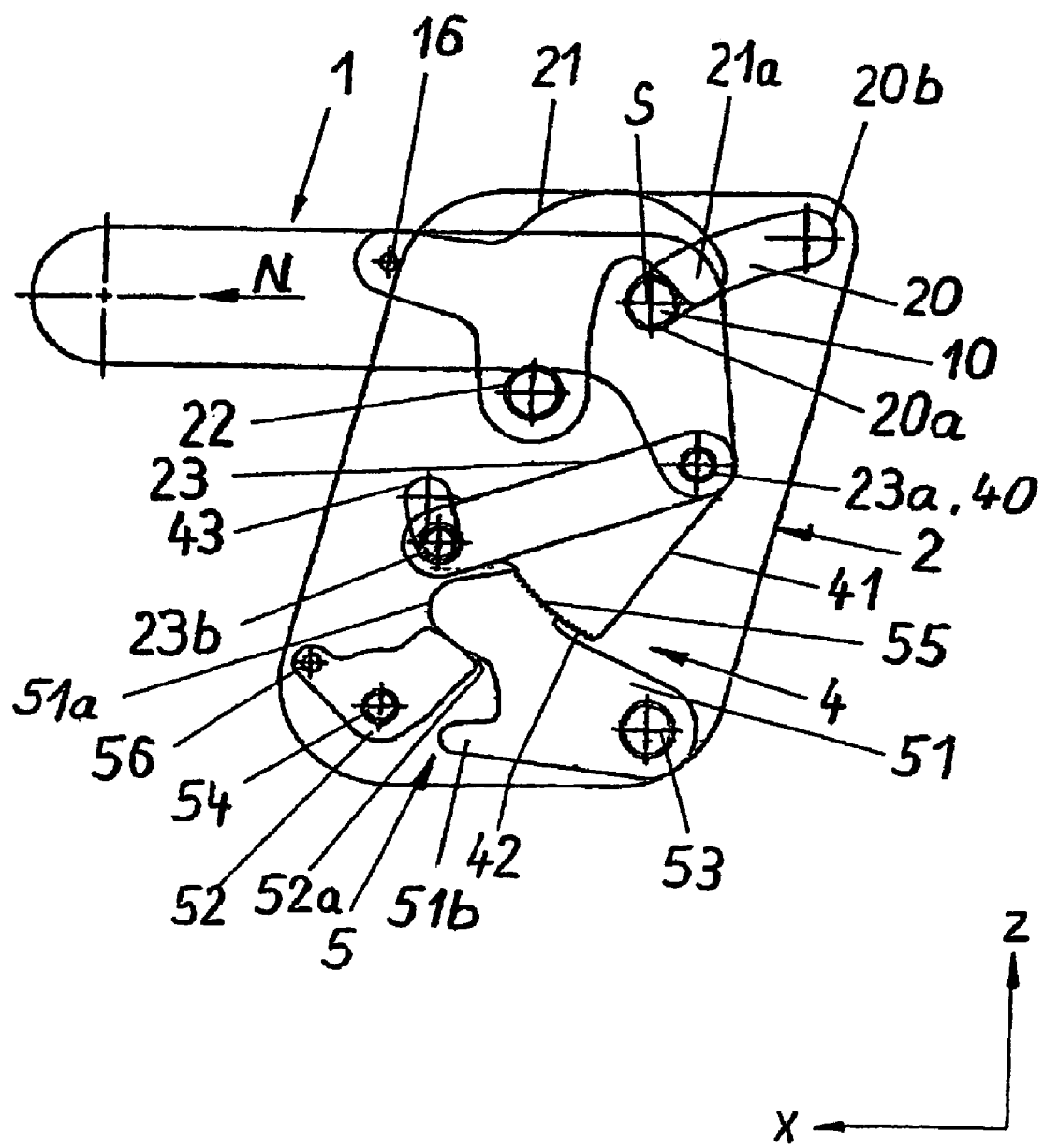

If the backrest fitting 1 of the backrest, as described previously by way of example with reference to FIGS. 3a and 3b, by unlocking of the bearing pin 10 and subsequent folding of the backrest forward, is now folded forward from its upright position illustrated in FIG. 10 (corresponding to a position of use of the backrest) into an essentially horizontal position (corresponding to a position of the backrest in which it is folded forward onto the seat surface), then the axis formed by the one coupling point 23a of the coupling lever 23 and the axis formed by the bearing point 40 of the adjusting rocker 41 thereby come into overlap, as illustrated with reference to FIGS. 11a to 11c, and therefore coincide.

FIGS. 11a to 11c in each case show the arrangement from FIG. 10 after the backrest has been folded forward onto the seat surface, corresponding to an essentially horizontal alignment of the backrest fitting 1. In this case, FIGS. 11a to 11c differ in the setting of the inclination of the backrest fitting 1 (and therefore of the backrest) before it is folded forward into the horizontal position. These different settings can be seen with reference to the different angular position of the adjusting rocker 41 in FIGS. 11a, 11b and 11c.

The setting of the adjusting rocker 41 that is shown in FIG. 11a (and is fixed by means of the locking device 5) corresponds to a very pronounced inclination of the backrest fitting 1 to the rear in its position of use. The setting of the adjusting rocker 41 that is illustrated in FIG. 11b corresponds to an average inclination of the backrest fitting 1 to the rear in its position of use, specifically precisely to that inclination N of the backrest fitting 1 in its position of use, as is illustrated in FIG. 10. This is because the adjusting rocker in FIG. 10 is situated in the same angular position as in FIG. 11b. FIG. 11c finally shows a backrest fitting 1 which has been folded forward and which was aligned virtually vertically, i.e. parallel to the vertical vehicle axis, before it was folded forward.

It is clear with reference to FIGS. 11a to 11c that the axis defined by one coupling point 23a of the coupling lever 23 and the axis defined by the bearing point 40 of the adjusting rocker 41 are brought into overlap in all three cases, i.e. irrespective of whether the backrest fitting 1 was in a very greatly rearwardly inclined position before it was folded forward (as in the case of FIG. 11a) or in a position with average inclination to the rear (as in the case of FIG. 11b) or in a virtually vertical alignment with at most a small inclination (as in FIG. 11c). In all three cases, when the backrest is folded forward, the one, upper coupling point 23a of the coupling lever has assumed a position at the end, in which it is positioned below the bearing point 40 of the adjusting rocker 41 (on the other side of the supporting plate 2). This is achieved by said coupling point 23a and the bearing point 40 being situated on a circular path with a defined radius R about the pivot axis S of the backrest fitting 1 and by this pivot axis S, at the beginning and at the end of the folding movement of the backrest from a position of use into its folded-forward position, being positioned in each case at the same end 20a of the guide path 20, i.e. at precisely the same point on the supporting plate 2.

The effect therefore achieved with the arrangement which is illustrated in FIG. 10 and is explained in greater detail with reference to FIGS. 11a to 11c is that the backrest fitting 1 and therefore the backrest R, after being folded forward onto the seat surface, are positioned in each case essentially horizontally in the same position over the seat surface of the corresponding vehicle seat irrespective of the angle of inclination which they had before they were folded forward. Accordingly, even a backrest which was inclined originally to the rear to a pronounced extent can therefore be folded forward directly onto the seat surface without the backrest previously having had to be transferred into an essentially vertical position of use.

Figure 12:
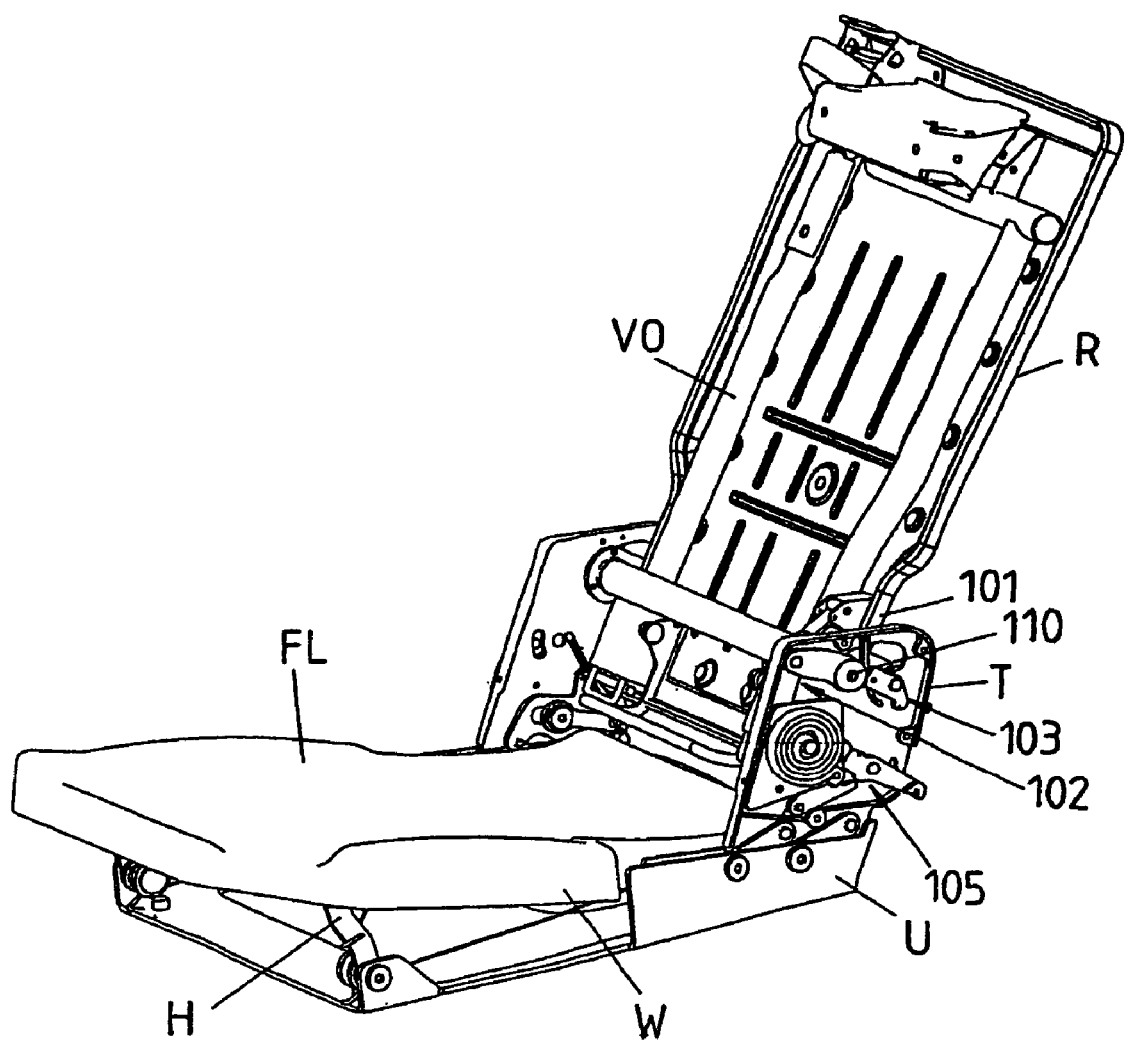
FIGS. 12a and 12b show a perspective illustration and a side view of a motor vehicle seat with a backrest which can be adjusted in its inclination and can additionally be folded forward onto the seat surface and has a variable pivot axis.

FIGS. 12a and 12b illustrate a motor vehicle seat which comprises a seat frame U which, on the one hand, bears a seat trough W, which can be adjusted in height and inclination by means of a setting device H and which defines a seat surface FL for a seat user and to which, on the other hand, is fastened a supporting plate T to which a backrest R, which has a front side VO serving to support a seat user's back, is coupled pivotably. In this case, the actual seat surface of the motor vehicle seat is formed not by the seat trough W, but rather by a seat cushion which is to be arranged on the seat trough. However, the particular setting of the height and inclination of the seat trough W defines the position of the seat surface FL. In a corresponding manner, a backrest cushion, against which a seat user can lean with his back, is to be arranged on the front side VO of the backrest R.

The motor vehicle seat illustrated in FIG. 12a can be adjusted, on the one hand, in its inclination with respect to the vertical vehicle axis z, so that the backrest R can assume a plurality of different positions of use, in which its serves in each case to support a seat user's back, but in each case has a different inclination with respect to a predetermined vertical (for example, the vertical vehicle axis z in the case of a seat fitted in a motor vehicle). In addition, the backrest R can be folded forward onto the seat surface FL of the motor vehicle seat, with the result that additional transporting space is provided above the backrest R or the seat can be displaced forward in the longitudinal direction x of the vehicle within the context of an "easy-entry function".

FIGS. 13 and 14 illustrate two different embodiments of the means 1 to 5 which permit the adjustment of the inclination of the backrest R and the folding of it forward onto the seat surface FL, and which are in each case arranged on the supporting plate T. In this case, FIG. 13 shows an arrangement as can also be seen on the backrest fitting of the vehicle seat from FIGS. 12a and 12b, and FIG. 14 shows a modification of this arrangement. The arrangement illustrated in FIG. 14 will be firstly discussed below.

FIG. 14 shows a backrest fitting 101 which forms part of the backrest frame of the backrest R, illustrated in FIGS. 12a and 12b, of a motor vehicle seat and which has, in the region of its lower end along the vertical vehicle axis z, a pivot axis in the form of a bearing pin 110 via which the backrest fitting 101 is mounted pivotably on a frame subassembly T in the form of a supporting plate of the seat assembly. The bearing pin 110 of the backrest fitting 101 is mounted displaceably in a guide slot 120 of the supporting plate T, so that the bearing pin 110 and therefore the pivot axis of the backrest fitting 101 can be moved between the two ends of the guide slot 120 by displacement along the guide slot 120.

In the state which is illustrated in FIG. 14, such a movement of the bearing pin 110 along the guide slot 120 is prevented by a lever arm 131 of a locking lever 103, which is mounted pivotably on a bearing point 130 of the supporting plate T, acts on the bearing pin 110 via an intermediate element 201, which can be pivoted about an axis 200, and fixes said bearing pin in the guide slot 120 in the region of the first end. By this means, a combined pivoting and displacing movement of the bearing pin 110 in the guide slot 120 is impossible.

In this case, the locking lever 103 is preferably prestressed by means of an elastic element, which acts on an application point 133 of the locking lever 103, in the direction of the state illustrated in FIG. 14 by it counteracting a displacement of the bearing pin 110 in the guide slot 120. In this case, the locking lever 103 does not act via the intermediate element 201 directly on the bearing pin 110, but rather on a lever 121 of a gear arrangement 102, 104, on which the bearing pin 110 is held. The function of the gear arrangement 102, 104 will be explained further below.

To release the bearing pin 110 in the guide slot 120, the locking lever 103 has to be pivoted, so that it no longer acts on the intermediate element 201. During such a pivoting movement, the locking lever 103 is guided by a pin 132 in a guide slot 135 of the supporting plate T.

The pivoting lever 121, in which the bearing pin 110 of the backrest fitting 101 is held, is coupled via a coupling lever 123 to a toothed segment lever 141 of the gear arrangement 102, 104, which segment lever forms a gear element 104 on which a compression spring DF acts. For this purpose, the coupling lever 123 is connected in an articulated manner at its one, upper end 123*a* to the pivoting lever 121 and at its other, lower end 123*b* to the toothed segment lever 141. The toothed segment lever 141 can be pivoted about a bearing point 140 provided on the supporting plate T and has an external toothing 142 which is in engagement with a locking device 105 in such a manner that a pivoting movement of the toothed segment lever 141 is not possible in the state shown in FIG. 14.

In addition, the toothed segment lever 141 has a slotted guide 143 in which a pin 144 provided on the supporting plate T engages and which therefore serves to limit the possible pivoting range of the toothed segment lever 141.

The locking device 105 assigned to the toothed segment lever 141 comprises a primary locking element 151 which, as locking lever, can be pivoted about a bearing point 153 provided on the supporting plate T and which has a toothing region 155 which engages in the toothing region 142 of the toothed segment lever 141 in order to lock the latter. The primary locking element 151 is assigned a locking element 152 which is likewise designed as a locking lever, can be pivoted about a further bearing point 154 and bears with a stop 152*a* against an assigned stop 151*a* of the primary locking element 151 and thereby prevents a pivoting movement of the primary locking element 151 that would release the toothing 142 of the toothed segment lever 141.

A force application point 156 is provided on the secondary locking element 152 and a force which leads to a pivoting of the secondary locking element 152 can be introduced at it, so that the mutually assigned stops 151*a*, 152*a* of the two locking elements 151, 152 become disengaged. For triggering the corresponding pivoting movement of the secondary locking element 152, use can be made of different physical or technical principles, for example an actuator in the form of a solenoid or an electric motor or alternatively a manual actuating device, etc.

During the pivoting of the secondary locking element 152, the latter acts on an extension 151*b* of the primary locking element 151 and thereby causes a pivoting movement of the primary locking element 151 about the assigned pivot axis (bearing point 153), by means of which the toothing 155 thereof becomes disengaged from the assigned toothing 142 of the toothed segment lever 141.

Furthermore, a linear spring DF in the form of a compression spring designed as a helical spring acts on the toothed segment lever 141 and is supported at one end on a stop AN of the supporting plate T and at the other end on a stop surface 146 of the toothed segment lever 141. The compression spring DF has the tendency to pivot the toothed segment lever 141 counterclockwise, which, owing to the coupling of the toothed segment lever 141 via the two further levers 121, 123 of the gear arrangement 102, 104, leads to a pivoting movement of the backrest fitting 101 likewise counterclockwise, with the result that the backrest R (cf. FIGS. 12*a* and 12*b*) has the tendency to be inclined forward, i.e. to be positioned with its front side VO against a seat user's back. However, in the state of the gear arrangement 102, 104 that is illustrated in FIG. 14, the previously described movement of the toothed segment lever 141 and of the backrest fitting 101 (and therefore of the backrest R) is prevented by the locking device 105 being in the locked state and therefore preventing a pivoting movement of the toothed segment lever 141.

In order to adjust the inclination of the backrest fitting 101 and therefore of the backrest R, first of all the locking device 105 has therefore to be unlocked by acting on the force application point 156 of the secondary locking element 152, so that the toothing 155 of the primary locking element 151 becomes disengaged from the assigned toothing 142 of the toothed segment lever 141 and no longer locks the latter. The toothed segment lever 141 then pivots automatically under the action of the compression spring DF in such a manner that it brings about, via the two further levers 121, 123 of the gear arrangement 102, 104, a pivoting movement of the backrest fitting 101 and therefore of the backrest overall forward, in the direction of a seat user's back. However, this pivoting movement only comes about if the seat user is not resting with his back against the front side VO of the backrest R (cf. FIGS. 12*a* and 12*b*). In the last-mentioned case, the pivoting movement would be limited or prevented by the counterforce exerted by the seat user on the front side VO of the backrest R.

Conversely, after the unlocking of the locking device 105 and therefore the release of the toothed segment lever 141, a pivoting of the backrest R to the rear can also be triggered by the seat user pressing with his back against the front side VO of the backrest R in order to incline the latter to the rear. This leads to a pivoting movement of the backrest fitting 101 (together with the backrest R) in the clockwise direction and—because of the coupling of the toothed segment lever 141 to the backrest fitting 101 via the levers 121, 123—results in a corresponding pivoting movement of the toothed segment lever 141 in the clockwise direction. This pivoting movement takes place counter to the compressive force (prestressing force) of the compression spring DF. That is to say, when acting on the front side VO of the backrest R, the seat user has to overcome that moment which is produced on the toothed segment lever 141 by the action of the compression spring DF. In this case, the gear arrangement 141 in the form of a lever arrangement can bring about a transmission of this moment, with the result that the torque exerted indirectly on the backrest fitting 101 by the compression spring DF differs from the moment exerted on the toothed segment lever 141 by the compression spring DF.

In addition, in the state which is shown in FIG. 14 and in which the backrest fitting 101 and therefore the backrest of the seat are locked in a certain position of inclination (by means of the locking device 105), a folding of the backrest R forward onto the seat surface FL of the motor vehicle seat illustrated in FIGS. 12a and 12b can be triggered by the locking lever 103, which is coupled to a backrest unlocking button, being pivoted counterclockwise, by actuation of the backrest unlocking button, in such a manner that it no longer acts via the intermediate element 201 via the pivoting lever 121 on which the bearing pin 110 of the backrest fitting 101 is arranged. After the bearing pin 110 and therefore the pivot axis of the backrest fitting 101 are unlocked, the backrest R can then be folded forward together with the backrest fitting 101 in the direction of the seat surface FL of the vehicle by the backrest R being grasped by a person and being folded over toward the seat surface FL. During this folding movement of the backrest R and of the backrest fitting 101, the bearing pin 110, which defines the respectively current pivot axis of the backrest fitting 101 during when it is folded forward, moves in the guide slot 120 between the two end stops thereof. The movement of the bearing pin 110 in the guide slot 120 is controlled here by the pivoting lever 121 and the coupling lever 123, via which levers the backrest fitting 101 is coupled to the toothed segment lever 141. Since, when the backrest R or the backrest fitting 101 is folded forward, the toothed segment lever 104 is locked by means of the assigned locking device 105, the backrest fitting 101, when being folded forward, is coupled via the pivoting lever 121 and the coupling lever 123 to an element fixed on the frame (cannot be moved with respect to the supporting plate T).

Overall, when the backrest R is folded forward, the bearing pin 110 moves from the state illustrated in FIG. 14 first of all from the first end of the guide slot 120 to its other, second end and then back again to the first end. When the backrest fitting 101 is completely folded forward and therefore the backrest R is situated above the seat surface FL, the bearing pin 110 is therefore situated again at the same point as at the beginning of the folding movement (FIG. 14) and can be locked there by means of the locking lever 103. During a subsequent, renewed swinging-up of the backrest from the position in which it is folded forward onto the seat surface FL into a position of use, corresponding to an essentially upright position with an inclination which can be set—as described further on—with respect to the vertical vehicle axis z, the above-explained movement of the bearing pin 110 in the guide slot 120 of the supporting plate T occurs again.

It is of particular significance in the present case that neither during the folding of the backrest forward nor during a later folding of the backrest back into a position of use does the compression spring DF, which acts on the toothed segment lever 141, act on the backrest fitting 101 (and therefore the backrest R). This is because the toothed segment lever 141 is locked by means of the locking device 105 during this folding movement and acts as an element of the supporting plate T, which element is fixed on the frame. The pivoting lever 121 and the coupling lever 123 of the lever arrangement 102, 104 are here designed in such a manner that they bring about precisely the desired movement of the bearing pin 110 to and fro in the guide slot 120 when the backrest fitting 101 is folded forward and there is therefore a corresponding pivoting movement of the bearing pin 110, which is arranged on the pivoting lever 121. The two levers 121, 123 therefore compensate for the pivoting movement of the backrest R and therefore of the backrest fitting 101 in conjunction with the guide slot 120 in such a manner that this folding movement can be carried out with the toothed segment lever 141 locked.

When the backrest R is folded forward onto the seat surface FL and when the backrest R is subsequently folded back into a position of use in which it can serve to support a vehicle occupant's back, the backrest R and backrest fitting 101 are therefore decoupled from the compression spring DF insofar as this spring does not in any way effect the folding movement. This is made possible by the folding movement taking place with the toothed segment lever 141 locked, the bearing pin 110 in the guide slot 120 under control by the pivoting lever 121 and the coupling lever 123 bringing about the required compensating movement which permits the backrest fitting 101 to be pivoted with the toothed segment lever 141 locked.

FIG. 13 shows a modification of the arrangement from FIG. 14, the difference being that the linear spring DF in the form of a compression spring is replaced by a torsion spring D in the form of a spiral spring which acts at one end on the bearing point 140 of the toothed segment lever 141 and at the other end on the cover of the supporting plate T by means of a bolt 157.

In the arrangement illustrated in FIG. 13, the torsion spring D has the same function as the linear spring DF illustrated in FIG. 14. It prestresses the toothed segment lever 141 in the clockwise direction, with the result that the latter has the tendency to pivot the backrest fitting 101 and therefore the backrest R (cf. FIGS. 12a and 12b) forward counterclockwise if the toothed segment lever 141 is not locked by means of the locking device 105. A pivoting of the backrest R to the rear therefore has to take place counter to the prestressing force of the torsion spring D.

Otherwise, the exemplary embodiment illustrated in FIG. 13 corresponds to the one explained with reference to FIG. 14.

The invention claimed is:
1. A seat assembly for a motor vehicle seat, comprising
   a seat frame which defines a seat surface for a motor vehicle occupant, and
   a pivotably mounted backrest which is foldable about a pivot axis onto the seat surface, wherein the pivot axis is movable along a predetermined path when the backrest is folded forward onto the seat surface, wherein
   the pivotably mounted backrest is adjustable in its inclination and has a front side serving to support a seat user's back, and the seat assembly further comprising
   a spring arrangement having at least one elastic element with which the backrest is prestressed elastically such that it is biased to pivot forward and lean with its front side against the seat user's back, the inclination of the backrest being adjustable counter to the action of the spring arrangement by application of force to its front side, and the spring arrangement acting on a gear element which is coupled to the backrest and which is assigned a locking device with which the gear element is lockable in different positions;
   wherein the gear element is part of a gear arrangement; and,
   wherein the gear arrangement serves for transmitting a torque exerted on the gear element by the spring arrangement.

2. A seat assembly for a motor vehicle seat, comprising
a seat frame which defines a seat surface for a motor vehicle occupant, and
a pivotably mounted backrest which is foldable about a pivot axis onto the seat surface, wherein the pivot axis is movable along a predetermined path when the backrest is folded forward onto the seat surface, wherein
the pivotably mounted backrest is adjustable in its inclination and has a front side serving to support a seat user's back, and the seat assembly further comprising
a spring arrangement having at least one elastic element with which the backrest is prestressed elastically such that it is biased to pivot forward and lean with its front side against the seat user's back, the inclination of the backrest being adjustable counter to the action of the spring arrangement by application of force to its front side, and the spring arrangement acting on a gear element which is coupled to the backrest and which is assigned a locking device with which the gear element is lockable in different positions; and,
wherein the gear element is assigned a coupling by which the backrest is decoupled from the gear element such that the backrest is foldable forward in the direction of the seat surface of the motor vehicle seat without the gear element being moved.

3. The seat assembly as claimed in claim 2, wherein the backrest, when it is decoupled from the gear element, is decoupled from the spring arrangement, so that the spring arrangement does not act on the backrest.

4. The seat assembly as claimed in claim 2, wherein the gear element is disengageable from the backrest, so that the gear element is not connected to the backrest.

5. A seat assembly for a motor vehicle seat, comprising
a seat frame which defines a seat surface for a motor vehicle occupant, and
a pivotably mounted backrest which is foldable about a pivot axis onto the seat surface, wherein the pivot axis is movable along a predetermined path when the backrest is folded forward onto the seat surface, wherein
the pivotably mounted backrest is adjustable in its inclination and has a front side serving to support a seat user's back, and the seat assembly further comprising
a spring arrangement having at least one elastic element with which the backrest is prestressed elastically such that it is biased to pivot forward and lean with its front side against the seat user's back, the inclination of the backrest being adjustable counter to the action of the spring arrangement by application of force to its front side, and the spring arrangement acting on a gear element which is coupled to the backrest and which is assigned a locking device with which the gear element is lockable in different positions; and,
wherein the gear element is assigned a coupling by which the backrest is decoupled from the gear element such that the backrest is foldable forward in the direction of the seat surface when the gear element is locked by a locking device.

6. A seat assembly for a motor vehicle seat, comprising
a seat frame which defines a seat surface for a motor vehicle occupant, and
a pivotably mounted backrest which is foldable about a pivot axis onto the seat surface, wherein the pivot axis is movable along a predetermined path when the backrest is folded forward onto the seat surface, wherein
the pivotably mounted backrest is adjustable in its inclination and has a front side serving to support a seat user's back, and the seat assembly further comprising
a spring arrangement having at least one elastic element with which the backrest is prestressed elastically such that it is biased to pivot forward and lean with its front side against the seat user's back, the inclination of the backrest being adjustable counter to the action of the spring arrangement by application of force to its front side, and the spring arrangement acting on a gear element which is coupled to the backrest and which is assigned a locking device with which the gear element is lockable in different positions; and,
wherein, in order to decouple the backrest from the gear element, the pivot axis of the backrest, when the backrest is folded forward, is moved along a predetermined path which is designed such that the movement of the pivot axis along the path prevents a reaction of the pivoting movement of the backrest on the gear element.

7. The seat assembly as claimed in claim 6, wherein the path is formed by a guide device in which the pivot axis is displaceably guided.

8. The seat assembly as claimed in claim 7, wherein locking means are provided by which the coupling is lockable in a state in which the gear element is coupled to the backrest.

9. The seat assembly as claimed in claim 7, further comprising locking means by which the coupling is lockable in a state in which the gear element is decoupled from the backrest.

10. The seat assembly as claimed in claim 6, wherein the locking means act on the pivot axis of the backrest and prevent the movement thereof along the path.

11. The seat assembly as claimed in claim 10, wherein the locking means are formed by a lever.

12. A seat assembly for a motor vehicle seat, comprising
a seat frame which defines a seat surface for a motor vehicle occupant, and
a pivotably mounted backrest which is foldable about a pivot axis onto the seat surface, wherein the pivot axis is movable along a predetermined path when the backrest is folded forward onto the seat surface, wherein
the pivotably mounted backrest is adjustable in its inclination and has a front side serving to support a seat user's back, and the seat assembly further comprising
a spring arrangement having at least one elastic element with which the backrest is prestressed elastically such that it is biased to pivot forward and lean with its front side against the seat user's back, the inclination of the backrest being adjustable counter to the action of the spring arrangement by application of force to its front side, and the spring arrangement acting on a gear element which is coupled to the backrest and which is assigned a locking device with which the gear element is lockable in different positions; and,
wherein the locking device of the gear element has a primary locking element and a secondary locking element, the primary locking element, in the locked state, acting on the gear element and the secondary locking element blocking the primary locking element in the locked state.

* * * * *